United States Patent
Kunze et al.

[11] Patent Number: 5,257,150
[45] Date of Patent: Oct. 26, 1993

[54] MAGNETIC TAPE CASSETTE APPARATUS HAVING A TILTABLE TRANSPORT MEMBER FOR SWITCHING TAPE TRANSPORT DIRECTION

[75] Inventors: Norbert Kunze, Ehringshausen; Georg Weber, Lohra, both of Fed. Rep. of Germany

[73] Assignee: U.S. Philips Corporation, New York, N.Y.

[21] Appl. No.: 945,423

[22] Filed: Sep. 14, 1992

Related U.S. Application Data

[63] Continuation of Ser. No. 614,327, Nov. 15, 1990, abandoned.

[30] Foreign Application Priority Data

Nov. 15, 1989 [DE] Fed. Rep. of Germany ....... 3937908

[51] Int. Cl.$^5$ ............................................. G11B 5/008
[52] U.S. Cl. ................................................. 360/96.3
[58] Field of Search ............. 360/96.3, 96.2, 96.1, 360/105; 242/201, 204

[56] References Cited

U.S. PATENT DOCUMENTS

| | | | |
|---|---|---|---|
| 4,636,889 | 1/1987 | Deutsch et al. | 360/96.2 |
| 4,708,302 | 11/1987 | Yamaguchi et al. | 360/96.3 |
| 4,924,336 | 5/1990 | Klos-Hein et al. | 360/105 |
| 5,018,401 | 5/1991 | Ida et al. | 360/96.3 |
| 5,065,266 | 11/1991 | Yoshimura | 360/96.3 |

Primary Examiner—John H. Wolff
Assistant Examiner—David D. Davis
Attorney, Agent, or Firm—Brian J. Wieghaus

[57] ABSTRACT

A magnetic-tape-cassette apparatus having a deck for magnetic-tape cassettes, which deck is constructed for playing and fast-winding operation with a first and an opposite second tape-transport direction. The deck has a first and a second selectively drivable reel disc for the magnetic tape, and a first and a second capstan adapted to be driven in different directions of rotation by a motor. A switching mechanism having a movable transport member switches the reel-disc drive from one reel disc to the other reel disc in order to change the tape-transport direction. The transport member has axially spaced toothed-rack portions which selectively cooperate with oppositely rotating toothed drive wheels for moving the transport member. The transport member is arranged to be pivotable transversely of its direction of translation in such a way that the meshing between a toothed-rack portion and a drive wheel is cancelled in the final stage of the translation movement of a tilting movement of the transport member to disengage the teeth. The tilting movement and the return into a neutral center position are obtained by a return spring which is pretensioned during the transverse movement.

6 Claims, 27 Drawing Sheets

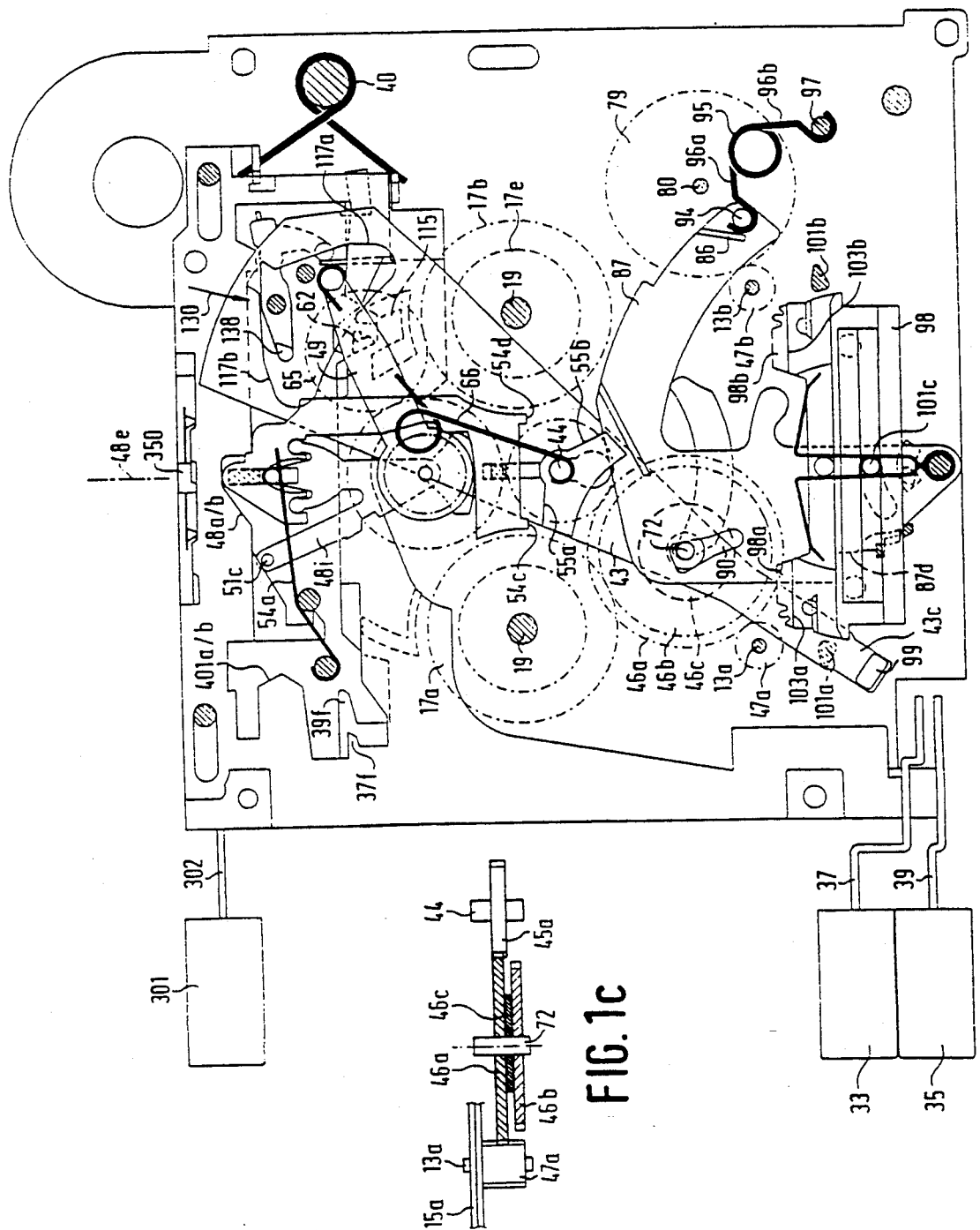

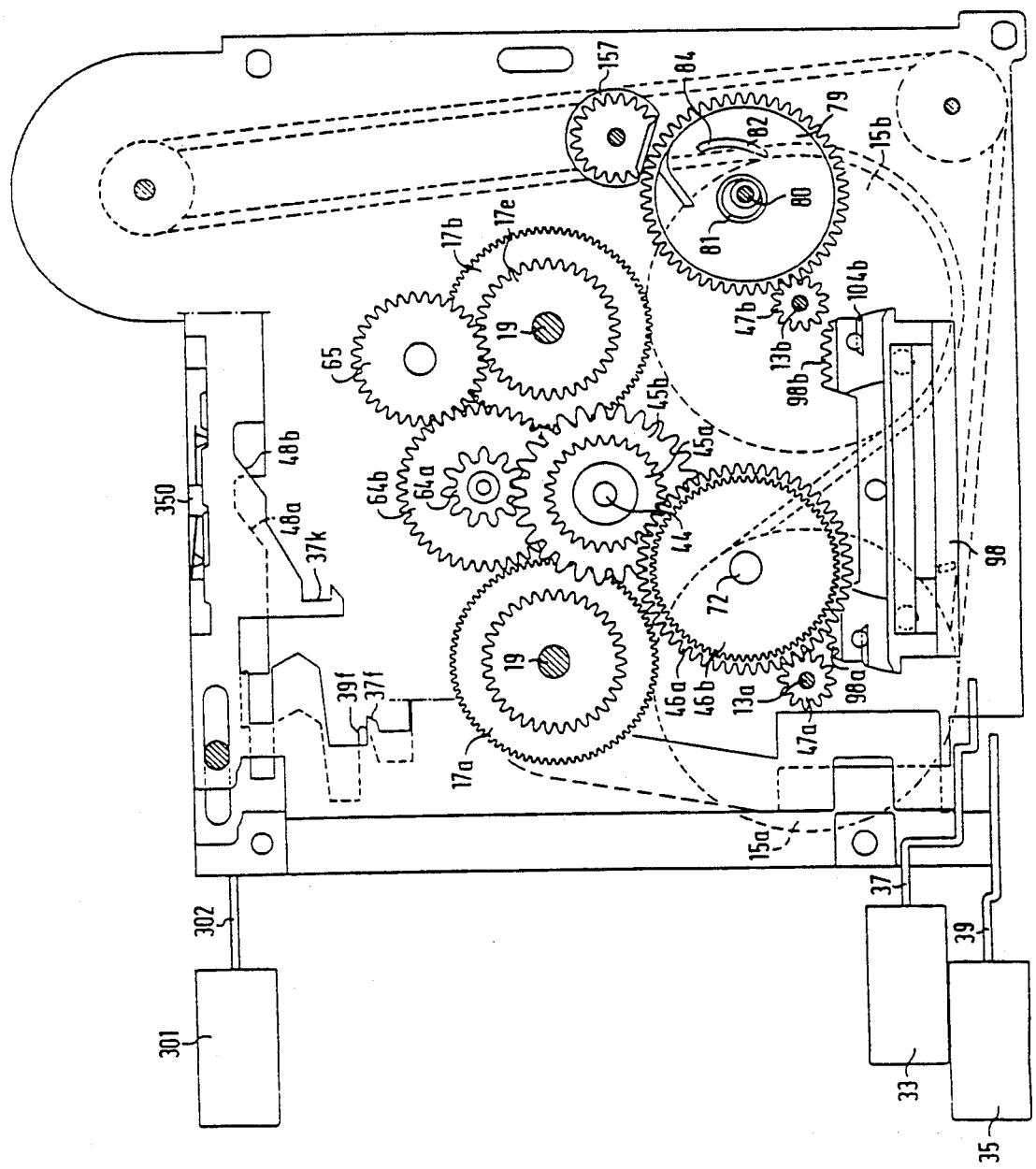

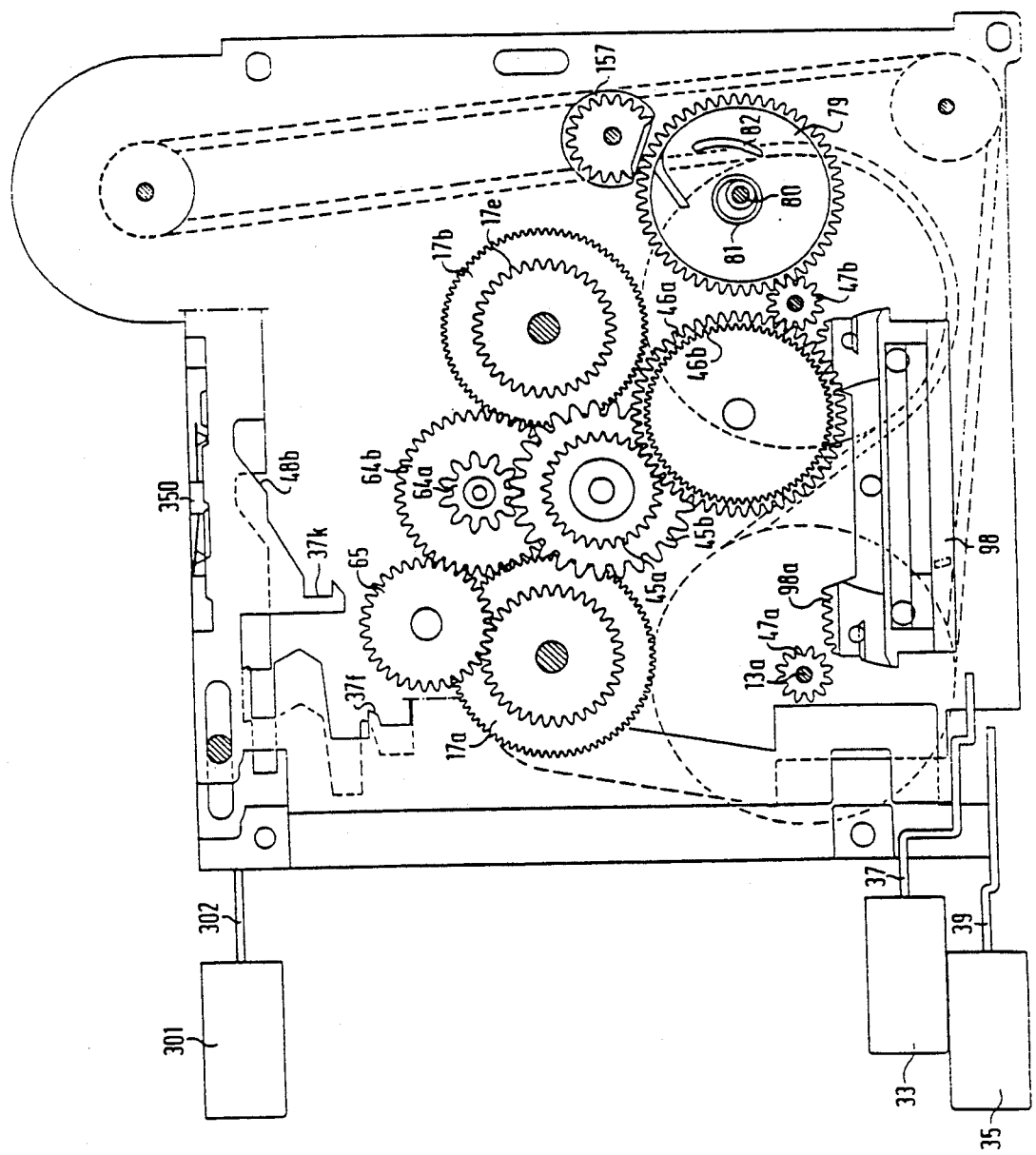

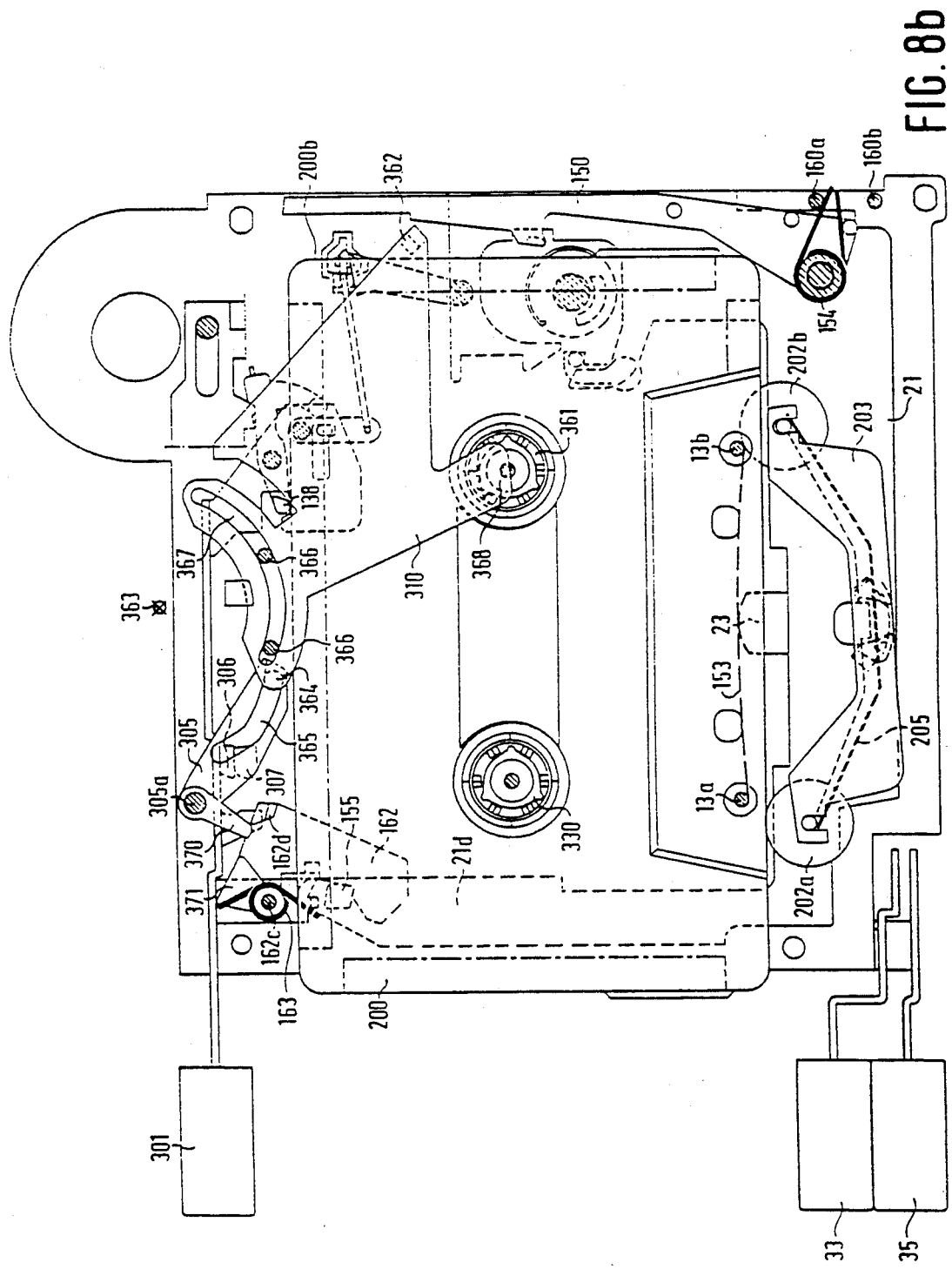

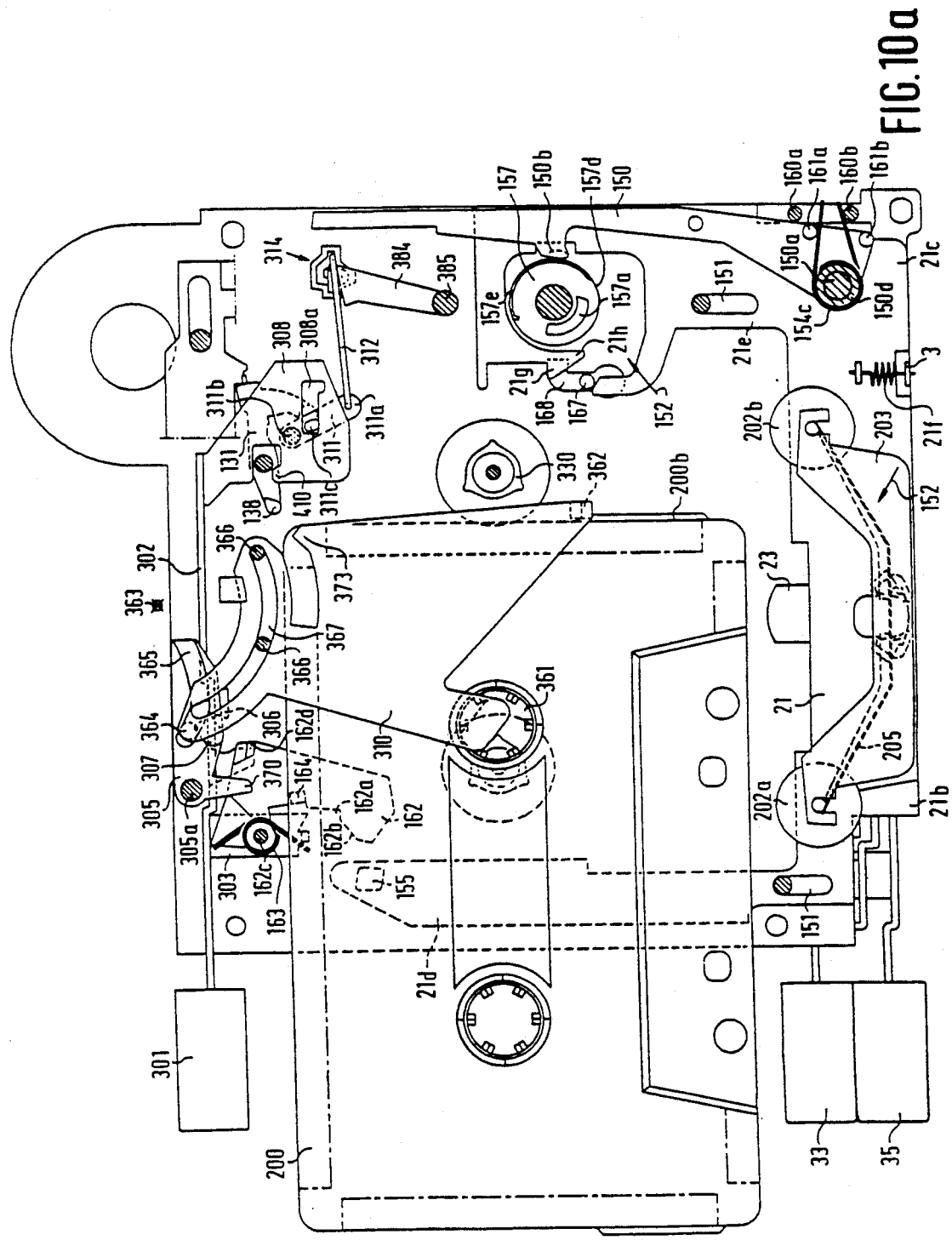

MAGNETIC TAPE CASSETTE APPARATUS HAVING A TILTABLE TRANSPORT MEMBER FOR SWITCHING TAPE TRANSPORT DIRECTION

This is a continuation of application Ser. No. 07/614,327, filed on Nov. 15, 1990, now abandoned.

BACKGROUND OF THE INVENTION

The invention relates to a magnetic-tape-cassette apparatus comprising a deck for magnetic-tape cassettes, which deck is constructed for playing and fast-winding operation with a first and an opposite second tape-transport direction, for which purpose it comprises, in addition to a first and a second selectively drivable reel disc for the magnetic tape, a first and a second capstan adapted to be driven in different directions of rotation by a motor, and which magnetic-tape-cassette apparatus comprises a switching mechanism comprising a movable transport member by means of which the reel-disc drive can be switched from one reel disc to the other reel disc in order to change the tape-transport direction, the transport member having axially spaced toothed-rack portions.

DE-OS 38 36 246 describes a switching mechanism with a transport member having toothed-rack portions at both ends in the direction of longitudinal movement. The longitudinal movement of the transport member causes toothed segments to be moved, via which toothed segments pressure rollers associated with the capstans can alternately be lifted off or applied to the capstans or can both be lifted off the capstans. The transport member is actuated via a lever system which changes over when the direction of rotation of the drive motor changes.

It is an object of the invention to provide a magnetic-tape-cassette apparatus comprising a deck of the type defined in the opening paragraph, in which during the movement of the transport member the transport member switches the drive from one reel disc to the other in the case that a drive motor having only one direction of rotation is used.

According to the invention this object is achieved in that for moving the transport member the toothed-rack portions selectively cooperate with oppositely rotating toothed drive wheels, and the transport member is arranged to be pivotable transversely of its direction of translation in such a way that the meshing between a toothed-rack portion and a drive wheel is cancelled in the final stage of the translation movement by a tilting movement of the transport member to disengage the teeth, said tilting movement and the return into a neutral center position being obtained by means of a return spring which is pretensioned during the transverse movement.

After a specific travel the transport member is thus disengaged from the moving teeth by means of the return spring and is returned into its neutral center position by means of the same return spring. This construction is very compact and reduces the number of parts.

In a further embodiment of the invention the return spring has a spring limb which, as it is pretensioned, presses against a pressure pin of the transport member in the tilting direction for disengagement, another spring limb being pretensioned in the return direction by means of a coupling element of the transport member. Thus, one of the operating functions, such as tilting and returning to the neutral center position, is assigned to each of the legs of the return spring itself.

In a further embodiment of the invention at its axial end portions the transport member has guide-pin grooves and tilting grooves which extend parallel to the longitudinal axis of said transport member and pairwise adjacent to one another and which are interconnected in such a way that a guide pin, which has entered a guide-pin groove during the transverse movement, changes over from the guide-pin groove into the tilting groove in the tilting range, the transport member being tilted to cancel meshing of the teeth both under the influence of the disengaging forces of the teeth and under the influence of the force of the return spring. A transport member of such a configuration can be injection-moulded without any problems The translational movements are performed by the toothed drive wheels, the pivotal movement both as regards its timing and spatial relationship being realised by means of the return spring In a further embodiment of the invention the return spring is constructed as a hairpin spring between whose limbs, viewed from the hairpin bend, an actuating pin and, spaced therefrom, a transport-member coupling element are situated Such a hairpin spring can be used very advantageously for both movement functions, i.e. the pivotal movement and the return to the neutral center position.

In a further embodiment of the invention the transport member carries a stop which cooperates with guide members which are fixedly connected to the apparatus, in such a manner that the stop brakes the return movement of the transport member by abutment against the guide members before said transport member reaches its neutral center position, as a result of which the return spring has a tilting effect on the transport member and tilts said member back into its non-tilted normal position, in which the stop has no effect and the transport member can be moved into and latched in its neutral center position.

BRIEF DESCRIPTION OF THE DRAWINGS

The invention will now be described in more detail with reference to the drawings. In the drawings FIGS. 1a and 1b, in a drive-mechanism plane and a switching plane, show the deck of a magnetic-tape-cassette apparatus for reverse operation with a device for the logic fast forward and reverse transport in a position for reverse play operation (Reverse Play), FIGS. 3a and 3b show the magnetic-tape cassette apparatus of FIG. 1 in a drive-mechanism plane and a switching plane in the case that the fast reverse mode has been started in the reverse play mode (Reverse Play), FIGS. 6a and 6b show the deck in a drive-mechanism plane and a switching plane in the position for switching to fast reverse operation from the normal play mode, FIG. 8b shows the deck with the head-mounting plate in the play position.

DESCRIPTION OF THE PREFERRED EMBODIMENTS

Figure 1A:
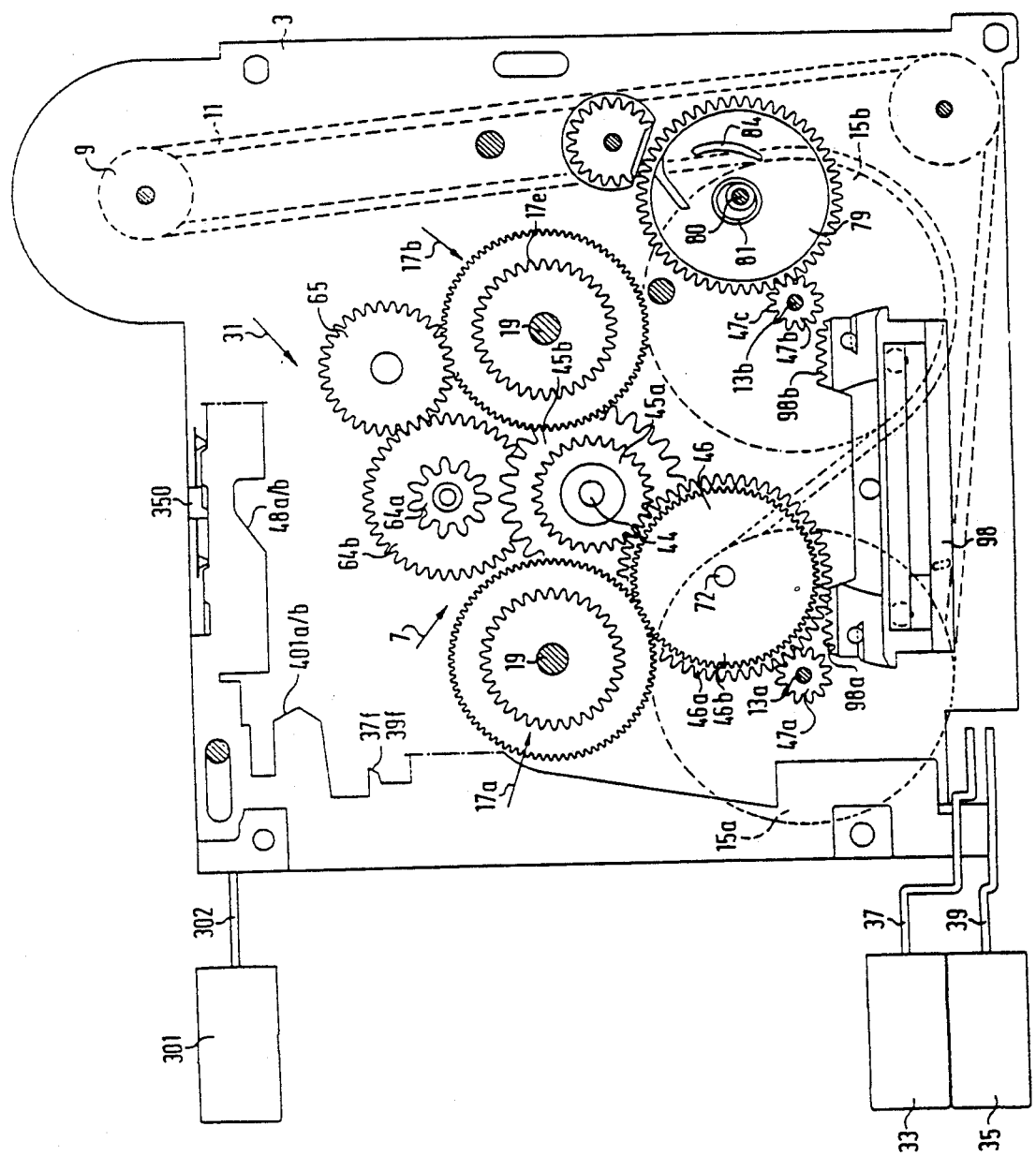
FIG. 1c is a sectional view of a coupling arrangement of the deck shown in FIGS. 1a/b.

The magnetic-tape-cassette apparatus comprises a deck (FIGS. 1a and 1b) having a chassis plate 3, to which all the apparatus assemblies and parts of the deck have been secured. These include a loading mechanism 5 and a play mechanism. The play mechanism comprises a drive motor 9, which drives capstans 13a and 13b via a belt 11. The capstans 13a and 13b are connected to flywheels 15a and 15b. The play mechanism further comprises reel discs 17a, 7b, which in conjunction with winding spindles 19 serve for driving winding mandrels 330.

The play mechanism further comprises a head-mounting plate 21 carrying a sound head 23 (FIG. 8). The head-mounting plate 21 is movable transversely of the cassette-insertion direction 25. For the transport of the magnetic tape 153 there are provided pressure rollers 202a, 202b (FIG. 9), which can be applied to one of the capstans 13a, 13b depending on the tape-pulling direction. The pressure rollers are applied by means of a pressure-roller actuation device 201.

DRIVE MECHANISM WITH REVERSING AND FAST-WINDING MECHANISM

FIGS. 1a and 1b show push-buttons for a fast-winding device 31, i.e. a button 33 for fast reverse winding and a button 35 for fast forward winding. A push-button rod 37 for fast reverse winding is associated with the push-button 33 and a push-button rod 39 for fast forward winding is associated with the push-button 35. Both push-button rods 37, 39 are urged in the outward direction by means of a spring 40. Both push-button rods 37, 39 have guide profiles 41a, b, 42a, b, which can act to change over the fast-winding device 31.

The fast-winding device 31 comprises a central switching lever 43, which is pivotable about a central spindle 44, about which an intermediate wheel 45 is also rotatable. The intermediate wheel 45 comprises two superposed toothed wheels 45a, b which are rigidly connected to one another. The central spindle 44 is supported in the chassis plate 3 so as to be movable in a slot 44a.

A double coupling wheel 46, which serves as the drive wheel for the reel discs 17a, 17b and the fast-winding device 31, is supported on the central switching lever 43 so as to be rotatable about a coupling spindle 72. As is illustrated in FIG. 1c, this double coupling wheel 46 comprises two toothed wheels arranged on the spindle 72, i.e. a primary coupling wheel 46a and a secondary coupling wheel 46b, which are rotatable relative to one another. The primary wheel 46a serves as the drive wheel which can mesh with and can be driven by the two flywheel toothed-wheels 47a and 47b of the capstans 13a and 13b respectively. The secondary wheel 46b functions as the driven wheel. The primary coupling wheel 46a and the secondary coupling wheel 46b are frictionally coupled to one another by means of a coupling 46c.

The fast-winding device 31 comprises a second switching lever 48, which in its turn pivotably supports a third switching lever 49.

The chassis plate 3 has a guide slot which preferably comprises two aligned sections 50a, 50b which are engaged by guide pins 51, 51a of the second switching lever 48. An opening 53 in the chassis plate, which opening is engaged by a guide pin 53a, is sector-shaped to limit the permissible pivotal movement of the guide pin 53a to the left and to the right. The second switching lever 48 has been divided into a switching-lever section 48f, which is rectilinearly guided in the slot sections 50a, 50b by means of the guide pins 51, 51a, and a switching-lever section 48g, which is pivotally supported on the rectilinearly guided switching-lever section 48f. Depending on the direction of rotation the pivotable switching-lever section 48g is pivoted about head portions 52a or 52b which are situated at mutually offset positions at opposite sides of a symmetry line 48e and, depending on the pivotal position, can pivot in recesses 52c, 52d in the rectilinearly guided section 48f of the second switching lever 48. In this way it is possible to obtain a continuous pivotal movement of the pivotable section 48g of the second switching lever 48 from one end position (FFW in the normal play mode) into another end position (FFW in the reverse play mode), without the axial distance and hence the correct meshing of the toothed wheels 45 and 64a being changed to an impermissible extent.

At its inner end 48h the pivotable switching-lever section 48g carries the guide pin 53a and at a limb 48i it carries a stop 51c, which cooperates with the profiles of the push-button rods 37, 39. The switching-lever section 48f, which is rectilinearly guided by the guide pins 51 and 51a, acts with actuating heads 54c, 54d on stop edges 55a, 55b of the central switching lever 43 and can shift and pivot this lever under the influence of actuating profiles 48a, 48b of the push-button rods 37, 39. A spring 54a urges the second switching lever 48 constantly in the outward direction. The second switching lever 48 may be a plastics part which is movably arranged on the chassis plate 3, for example by means of an outset moulding technique. The third switching lever 49 is supported on the pivotable switching-lever section 48g so as to be pivotable about the guide pin 53a and carries two pins 61, 62, which cooperate with the guide profiles 41a, 41b and 42a, 42b of the push-button rods 37 and 39 respectively.

A coaxial toothed-wheel set 64 is rotatable about the guide pin 53a, about which the third switching lever 49 is pivotable on the second switching-lever section 48g. This coaxial toothed-wheel set 64, which comprises two rigidly interconnected toothed wheels 64a and 64b, is constantly in mesh with the fast reverse winding wheel 65, which is supported on the third switching lever 49 and which, similarly to the toothed wheel 64b, can be brought in mesh with the reel discs 17a and 17b. One end of a tension spring 66 acts on the pin 61 of the third switching lever 49 and the other end is secured to the central spindle 44.

In the normal play mode (Play) the magnetic tape is moved past the sound head 23 either in the forward direction, i.e. the right-hand capstan 13b provides the traction for the magnetic tape and the right-hand reel disc 17b is the take-up reel disc, or in the reverse direction. In the last-mentioned case the traction is provided by the left-hand capstan 13a, the left-hand reel disc 17a being the take-up reel disc. In FIGS. 1 to 3 the deck has been set to the reverse play mode (Reverse Play), i.e. the capstan 13a pulls the magnetic tape and the left-hand reel disc 17a is the take-up reel disc. Starting from this reverse play mode the fast forward mode (FFW) will now be described with reference to FIG. 3 and the fast reverse mode (SRL) with reference to FIG. 2.

FAST WINDING IN THE REVERSE PLAY MODE (REVERSE PLAY)

Figure 7:
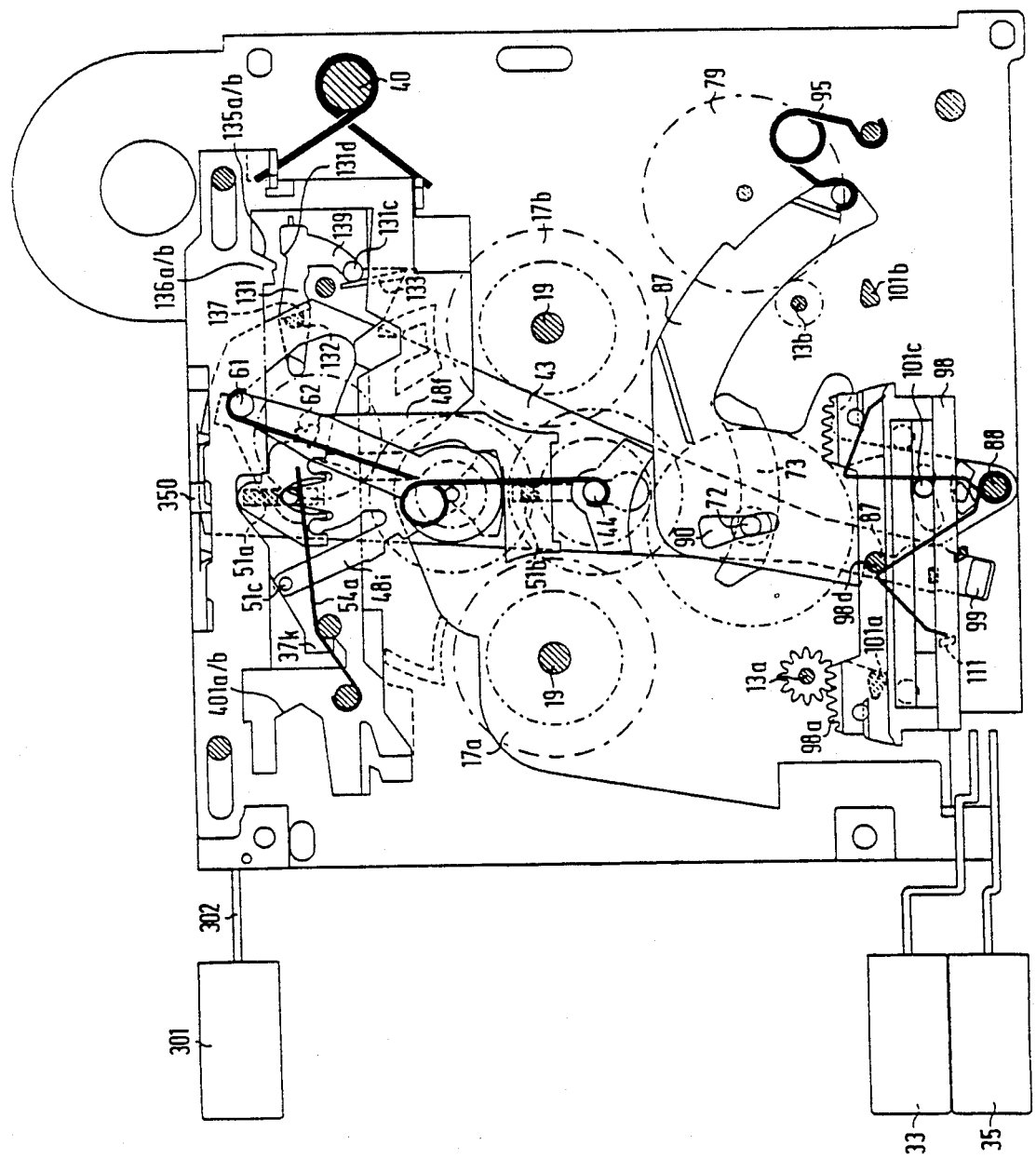
FIG. 7 shows the deck during the change-over from forward to reverse operation in the playing mode.

If the user wishes to select fast winding in the reverse play mode this is effected by the fast-winding device 31 by means of the central switching lever 43, the second switching lever 48 and the third switching lever 49 upon depression of one of the fast winding buttons 33, 35. For the sake of clarity the switching levers 43, 48 and 49 are shown separately in FIG. 7e. The cooperation of these levers 43, 48 and 49 in conjunction with the double coupling wheel 46a, b, the intermediate wheel 45, the toothed-wheel set 64a, b and the fast reverse winding wheel 65 in conjunction with the reel discs 17a or 17b results in fast forward winding (FFW) or fast reverse winding (FRW), depending whether the push-button 33 or 35 has been depressed. This proceeds as follows.

Figure 2A:
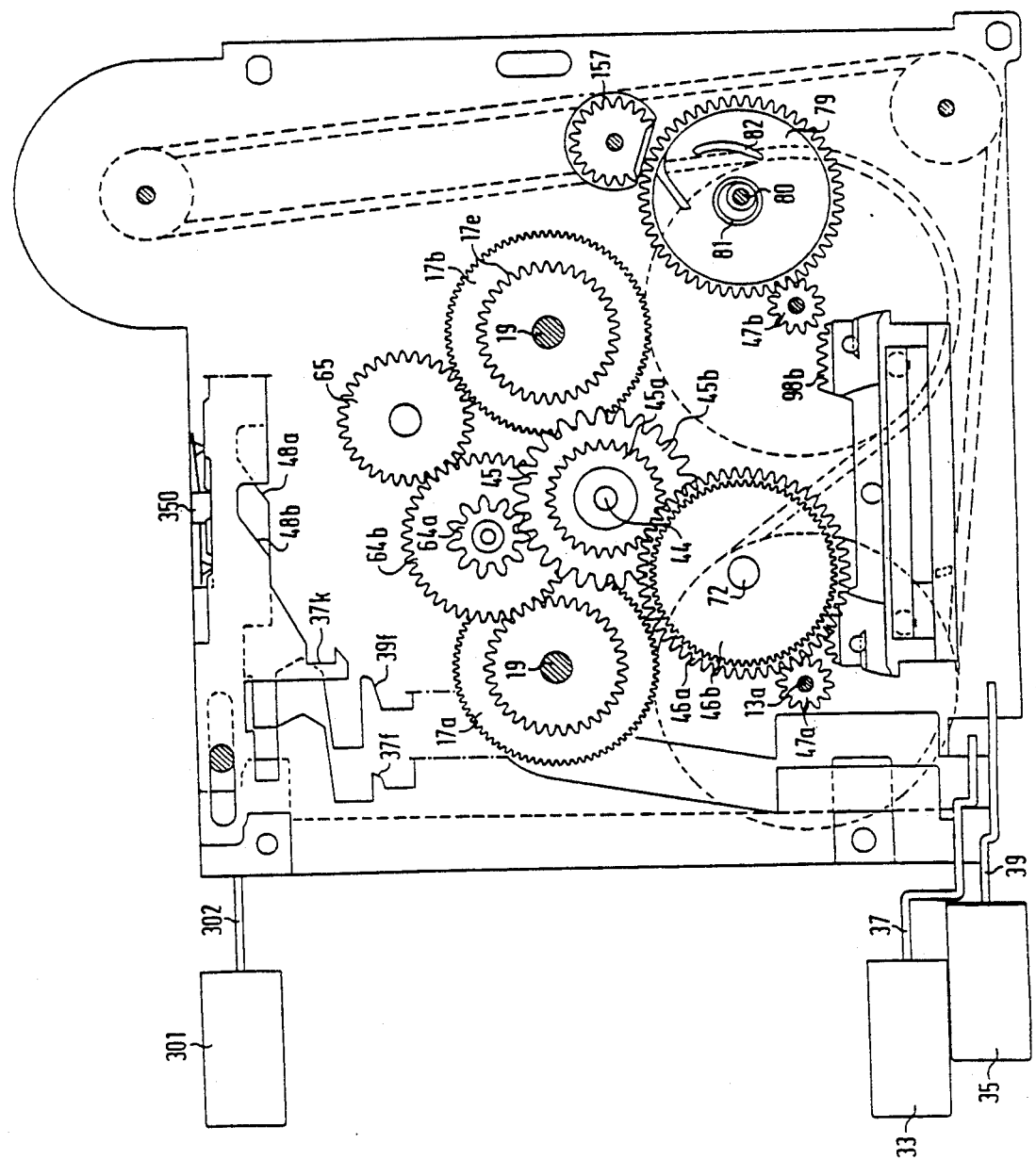
FIGS. 2a and 2b show the magnetic-tape-cassette apparatus of FIG. 1 in a drive-mechanism plane and a switching plane in the case that the fast forward mode has been started in the reverse play mode (Reverse Play)
Figure 2B:
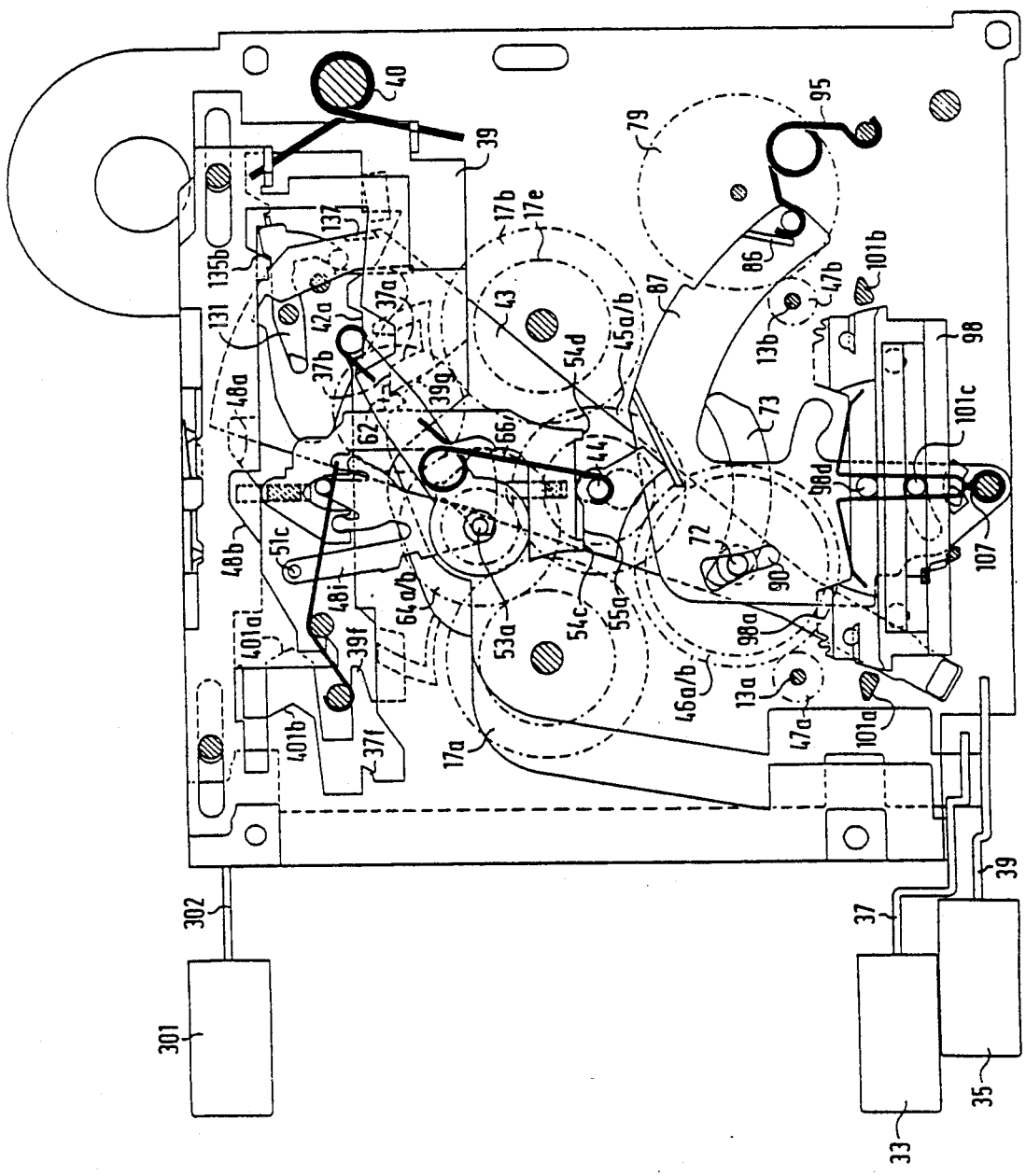

For fast forward winding in the reverse play mode the button 35 for fast forward winding is depressed, which corresponds to the situation shown in FIGS. 2a and b. The actuating profile 48a of the push-button rod 39 presses the second switching lever 48 inwards, thereby also causing the actuating heads 54c, 54d to move inwards and, via the edges 55a, 55b, press down the switching lever 43 in the proximity of the central spindle 44 and at the same time pivot this lever. When the push-button rod 39 moves inwards the pin 61 at the same time ascends the guide profile 42a. The pin 62 then swings out of the range of the FRW latching profile 37g and moves to the upper bounding wall 37b of this profile. As a result of this, the section 48g of the second switching lever 48 and the third switching lever 49 can pivot so far clockwise under the influence of the force exerted by the spring 66 that the guide pin 53a abuts against the guide profile 53. As the inward push-button movement proceeds the FFW wheel 64 meshes with the reverse reel disc 17a. The third switching lever 49 engages behind the FFW latching profile 39g. As a result of this, the third switching lever 49 is pivoted so far anti-clockwise that the teeth of the fast winding wheel 65 do not mesh with the right-hand reel disc 17b. The switching lever 43 is then pivoted slightly anti-clockwise. The anti-clockwise movement is caused by the pivotal movement of the switching lever 43 about the central spindle 44 and the movement of this spindle in the slot 44a. The double coupling wheel 46a, b has been pulled away from the reel disc 17a and, instead, the toothed-wheel set 64a, b is caused to engage with the left-hand reel disc 17a, the force being transmitted from the intermediate wheel 45 to the small toothed wheel 64a of the toothed-wheel set 64a, b. Fast forward winding can be discontinued by pressing the button 33 for fast reverse winding. A release profile 135b of the push-button rod 37 then urges a latch 131 of a latching device 130 back into a free central position (shown in FIG. 3b). The latching device will be described in more detail hereinafter.

Figure 3B:
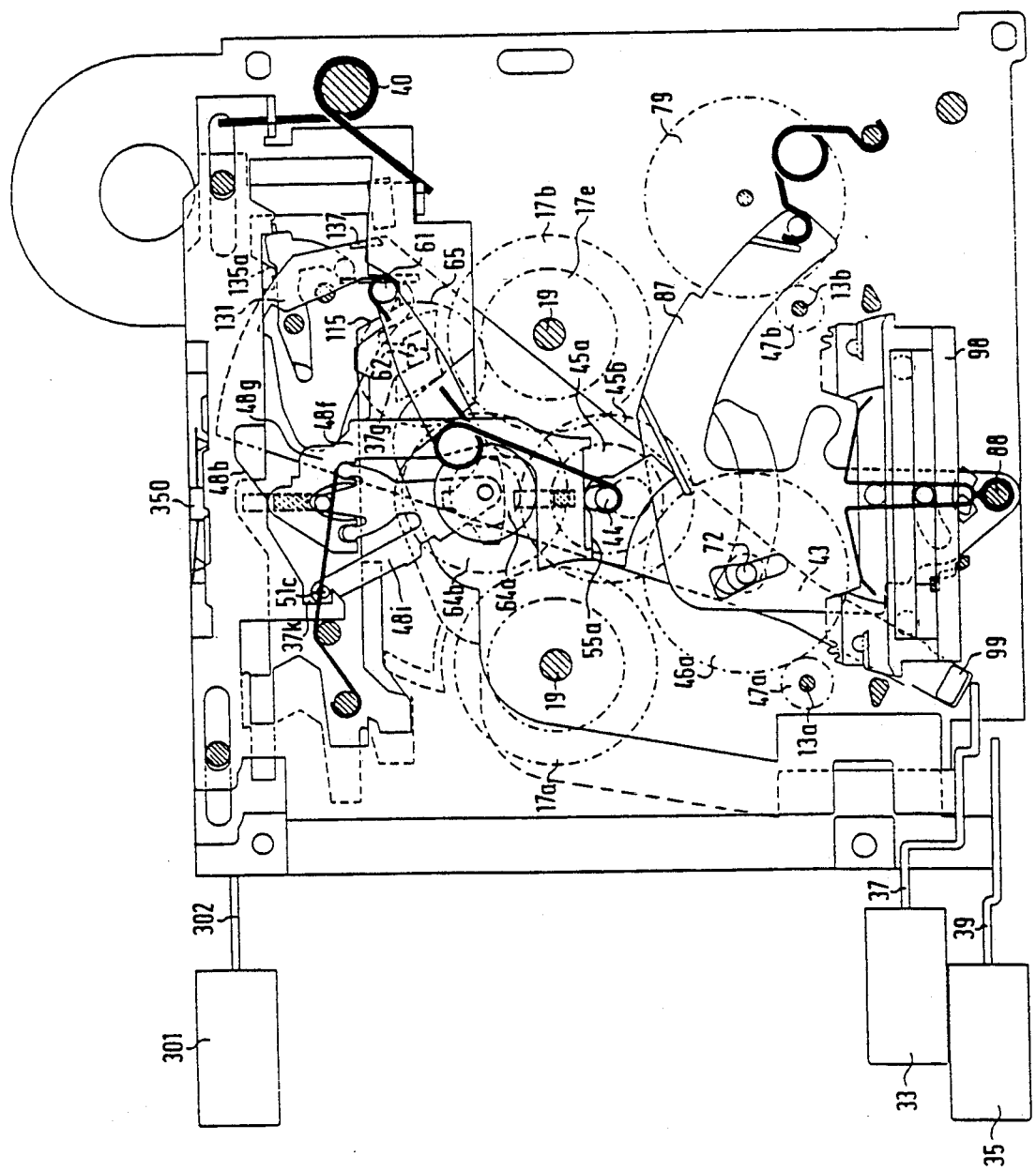

FIGS. 3a and 3b represent the situation for fast reverse winding in the reverse play mode. Fast rewinding can be started by pressing the button 33 with the associated push-button rod 37. When the button 33 is pressed the pin 61 moves down the guide profile 41a and the third switching lever 49 is pivoted clockwise. The pin 62 engages in the FRW latching profile 37g in the chassis 43 and thus keeps it locked in this position. The actuating profile 48b of the push-button rod 37 urges the rectilinearly guided switching-lever section 48g inwards against the edge 55 of the central switching lever 43. The central switching lever 43 is pivoted anti-clockwise because it is simultaneously shifted in the slot 44a. The secondary coupling wheel 46b of the double coupling wheel 46a, b is thus lifted off the left-hand reel disc 17a. In the now operative fast reverse winding mode the flywheel toothed-wheel 47a (primary coupling wheel) rapidly drives the right-hand reel disc 17b via the drive wheel 46a of the double coupling wheel 46a, b, the intermediate wheel 45, the small toothed wheel 64a of the toothed-wheel set 64a, b, the large toothed wheel 64b of the toothed-wheel set 64 and the fast reverse winding wheel 65. Fast reverse winding is discontinued by pressing the button 35 for fast forward winding, which by means of its pretensioning and release profile 135a urges the latch 131 back into the center position.

REVERSING MECHANISM

Since the deck is a deck with reversible tape transport the reel-disc drive should be changed over in both tape-pulling directions when the tape stops at the end of the tape, a distinction being made between the situation in which the tape end is reached in a play mode or in a fast winding mode. In both situations the reversal of the tape-pulling direction and of the tape drive is effected by means of a reversing device 68, which device pivots the central switching lever 43 about the central spindle 44 in such a way that the double coupling wheel 46a, b is switched from the capstan 13a with the associated flywheel toothed-wheel 47a to the capstan 13b with the associated toothed flywheel 47b. Simultaneously with the change-over of the switching lever 43 the third switching lever 49, as seen in the drawings (FIGS. 4 to 6), pivots from the right-hand side to the left-hand side of the central switching lever 43. After the pivotal movement the pin 61 cooperates with the guide profiles 42b and 41b. A change-over of the pressure rollers 202a, b is effected concurrently.

The reversal of the tape-transport direction when the end of tape is reached will be described with reference to FIGS. 1a and 1b. Initially the description is based on the assumption that the end of the tape is reached in the reverse play mode. The deck is switched from the situation illustrated in FIG. 1 to the situation illustrated in FIG. 4. In the reverse play mode this reversal process is initiated by means of a wiper 69 which forms part of a control member 77 and which engages with the secondary coupling wheel 46. A switching arm 75 of the control member 77 serves as the switching arm. There is provided a switching wheel 79 having an eccentric ring-shaped profile 81 around its spindle 80. The switching wheel 79 further has a spiral switching profile 82. The switching arm 75 comprises a follower 83 which can travel around the profile 81 and engage with the switching profile 82. The switching wheel 79 is constantly in mesh with the toothed wheel 47b of the flywheel 15b and the capstan 13b.

Figure 4A:
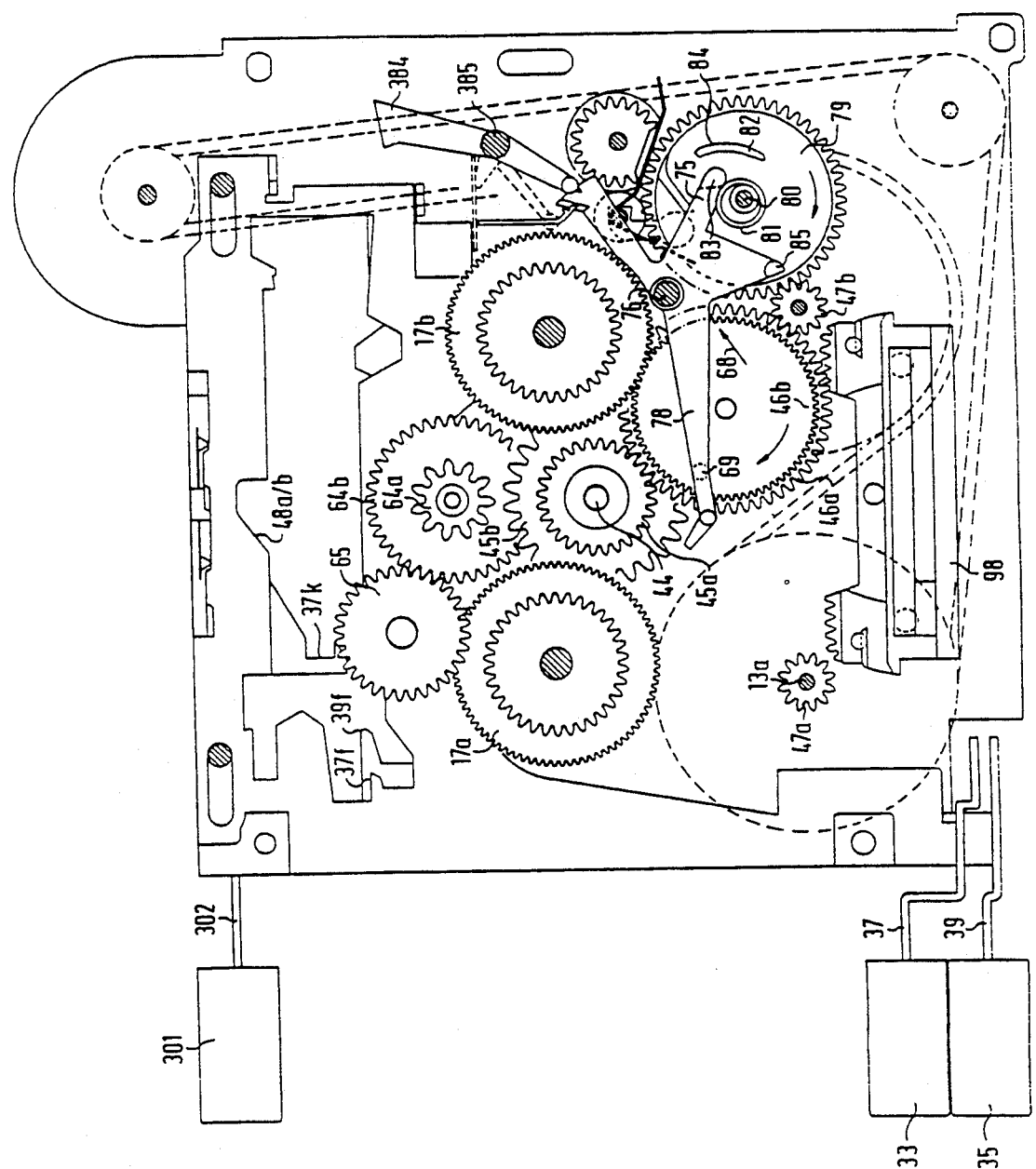
FIGS. 4a and 4b show the deck of FIG. 1 in a drive-mechanism plane and a switching plane after the change-over from the reverse play mode to the normal play mode.
Figure 4B:
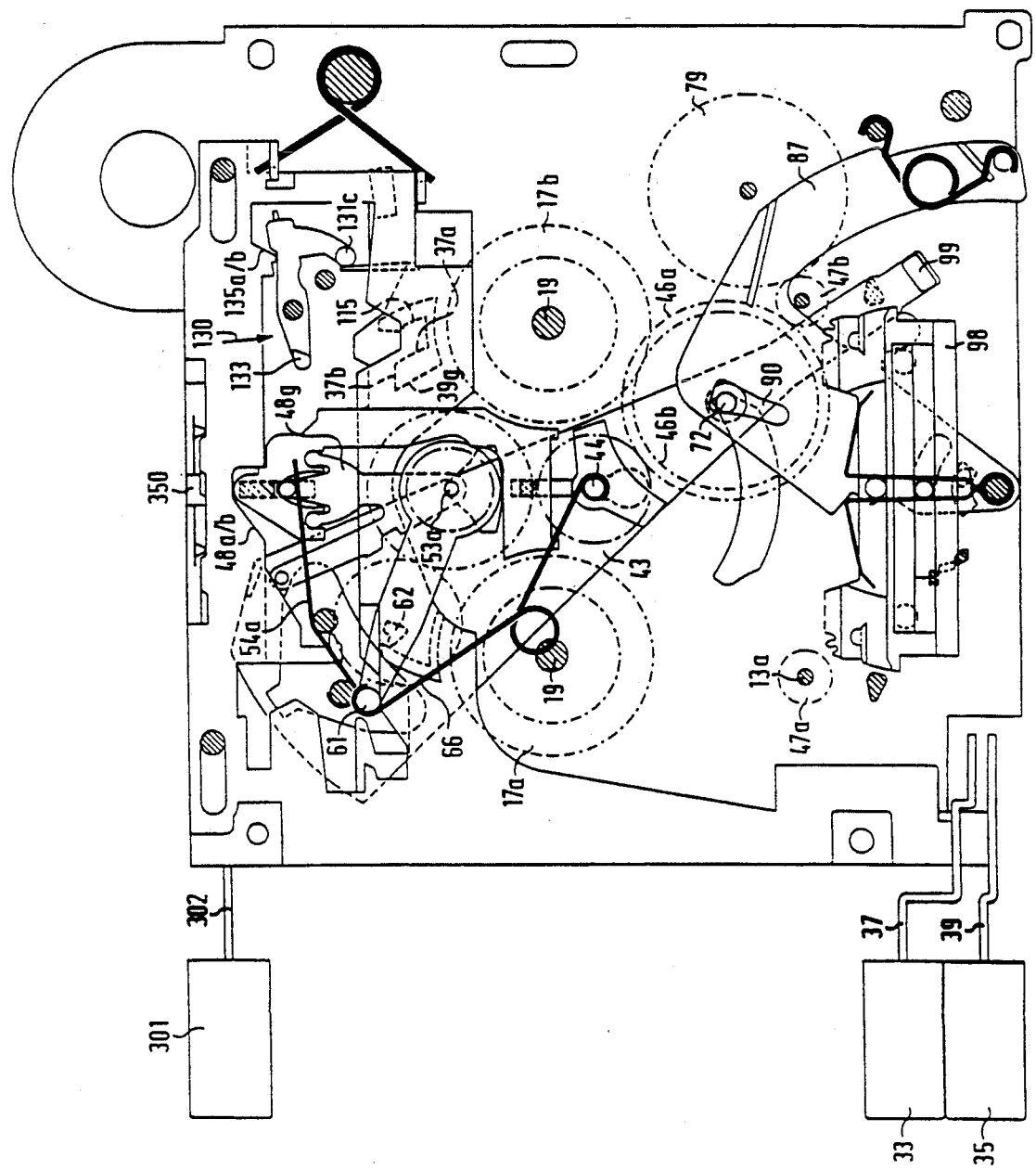

If the drive wheel 46b (secondary coupling wheel), as is illustrated in FIGS. 1a and 1b, is rotated because the driven reel disc 17a and its spindle 19 rotate, the arm 78 of the control member 77 is pivoted clockwise as a result of the friction between the driven wheel 46b and the wiper 69. This results in the follower 83 following the profile 81 (FIG. 4a). If, however, for example because the end of the tape is reached, the driven reel disc 17a is stopped, the driven wheel 46b will also stop and the control member will no longer be pressed against the profile 81 by the above-mentioned frictional force. When this pressure ceases the follower 83 and hence the switching arm 75 will remain at the highest point of the profile 81, so that the follower 83 comes within the range of the switching profile 82. The follower 83 now runs onto the control surface 84 of the switching profile 82 and is moved outwards As a result of this outward movement a control pin 85 of the control member 77 is pressed against a stop surface 86 of a reversing plate 87 which is pivotable about a spindle 88. When the control pin 85 abuts against the stop surface 86 the reversing plate 87 is pivoted in the clockwise direction. The coupling spindle 72, which constantly engages in a slot 90 in the reversing plate 87, is pressed towards the other capstan 13b by the pivotal movement of the reversing plate 87, thereby causing the switching-lever arm 43c of the central switching lever 43 to be also pivoted towards the capstan 13b.

Figure 7A:
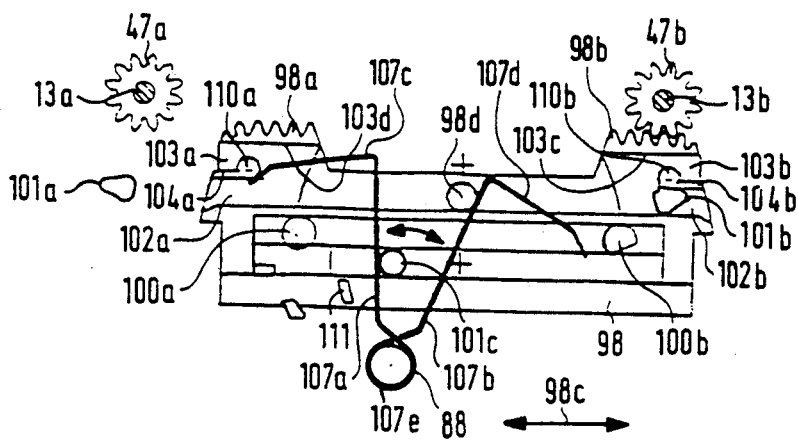
FIGS. 7a to 7d illustrate stages of movement of a transport rod which during the switching process is tilted laterally and which is urged back into its neutral position.

The construction of the reversing device 68, which now becomes operative, will now be described before proceeding with a further description of the reversal process during tape stoppage The reversing device 68 comprises a pivotable transport member 98 with toothed-rack portions 98a, 98b. During a direction reversal the transport member 98 is not only pivoted as indicated by a curved double arrow (FIG. 7a) but is also reciprocated in the directions indicated by a double arrow 98c in FIG. 7a. Viewed in the directions 98c the transport member 98 carries a coupling element 100a, 100b at both sides. Two fixed guide pins 101a, 101b have been secured to the chassis plate 3. An actuating pin 101c forms part of an actuating member 503 described in relation to the preferential starting direction. In a central position of the transport member 98, as can be seen in FIG. 1b, the guide pins 101a, 101b at both sides are situated outside a guide-pin groove 102a, 102b (FIG. 7a).

During the movement of the transport member 98 one of the guide pin slots 102a, 102b is engaged by one of the guide pins 101a, 101b. The relevant rack section 98a, 98b then meshes with the corresponding toothed flywheel 47a or 47b. Tilting grooves 103a, 103b extend parallel to the guide pin grooves 102a, 102b, which tilting grooves after passage of an abutment wall 104a or 104b are engageable by the guide pin 101a, 101b situated in the relevant guide pin groove 102a or 102b. The transport member 98 is then pivoted about the pin 101c which is fixedly arranged on the chassis. The switching lever arm 43c of the central switching lever 43 carries a rectangular projection 99 which is adapted to cooperate with the transport member 98.

Figure 7B:
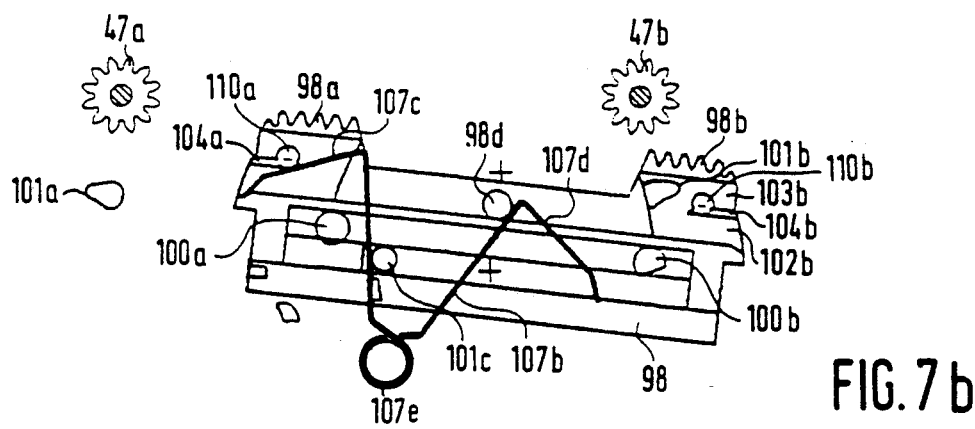

As the movements for the direction reversal proceed rectangular projection 99 presses against the transport member 98 when the reversing plate 87 (FIG. 1b) pulls the central switching lever 43 with the switching lever arm 43c, which faces towards the transport member 98, in the anti-clockwise direction towards the symmetry line 48e (FIG. 1b). As a result of this the transport member 98 is moved out of the position shown in FIG. 1b to the right, the guide pin groove 102b travels towards the guide pin 101b and is engaged thereby (FIG. 7a). The rack section 98b meshes with the right-hand toothed flywheel 47b; thus, the right-hand toothed flywheel 47b pulls the transport member 98 further to the right. During this movement of the transport member 98 the coupling element 100a abuts against an edge 87d of the reversing plate 87, so that this plate is pivoted further clockwise. As a result of the coupling between the reversing plate 87 and the central switching lever 43 via the spindle 72 (which is guided in the slot 90) the central switching lever 43 is also pivoted but in the anti-clockwise direction. The transport member 98 continues to move to the right until the guide pin 101b has moved passed the abutment wall 104b and can engage the tilting groove 103b. The transport member 98 is then tilted and the right-hand flywheel 47b is disengaged from the rack section 98b (FIG. 7b).

The reversing plate 87 (FIG. 1b) carries a mounting pin 94 to which one leg 96a of a leg spring 95 is attached. The other leg 96b of the leg spring 95 is attached to a mounting pin 97 on the chassis plate 3. During the pivotal movement in the clockwise direction from the position of FIG. 1b to FIG. 4b the leg spring 95 is tensioned up to its over-center point. After passage beyond this point the direction of the force acting on the reversing plate 87 is reversed, so that the reversing plate 87 and hence the central switching lever 43 are pivoted further into the forward play position shown in FIG. 4b under the influence of the spring force.

Figure 5A:
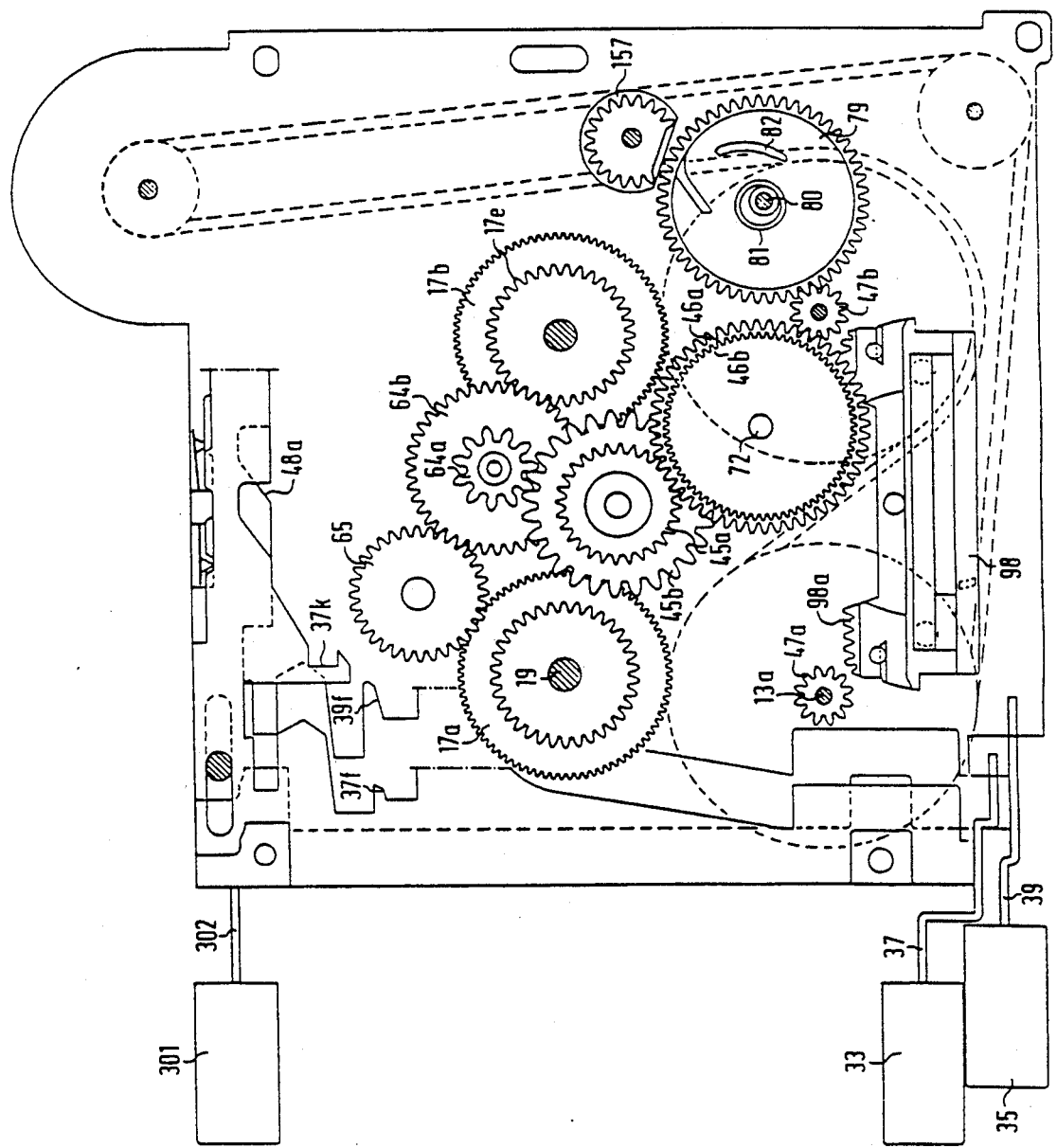
FIGS. 5a and 5b show the deck in a drive-mechanism plane and a switching plane in the position for switching to fast forward operation from the normal play mode.
Figure 5B:
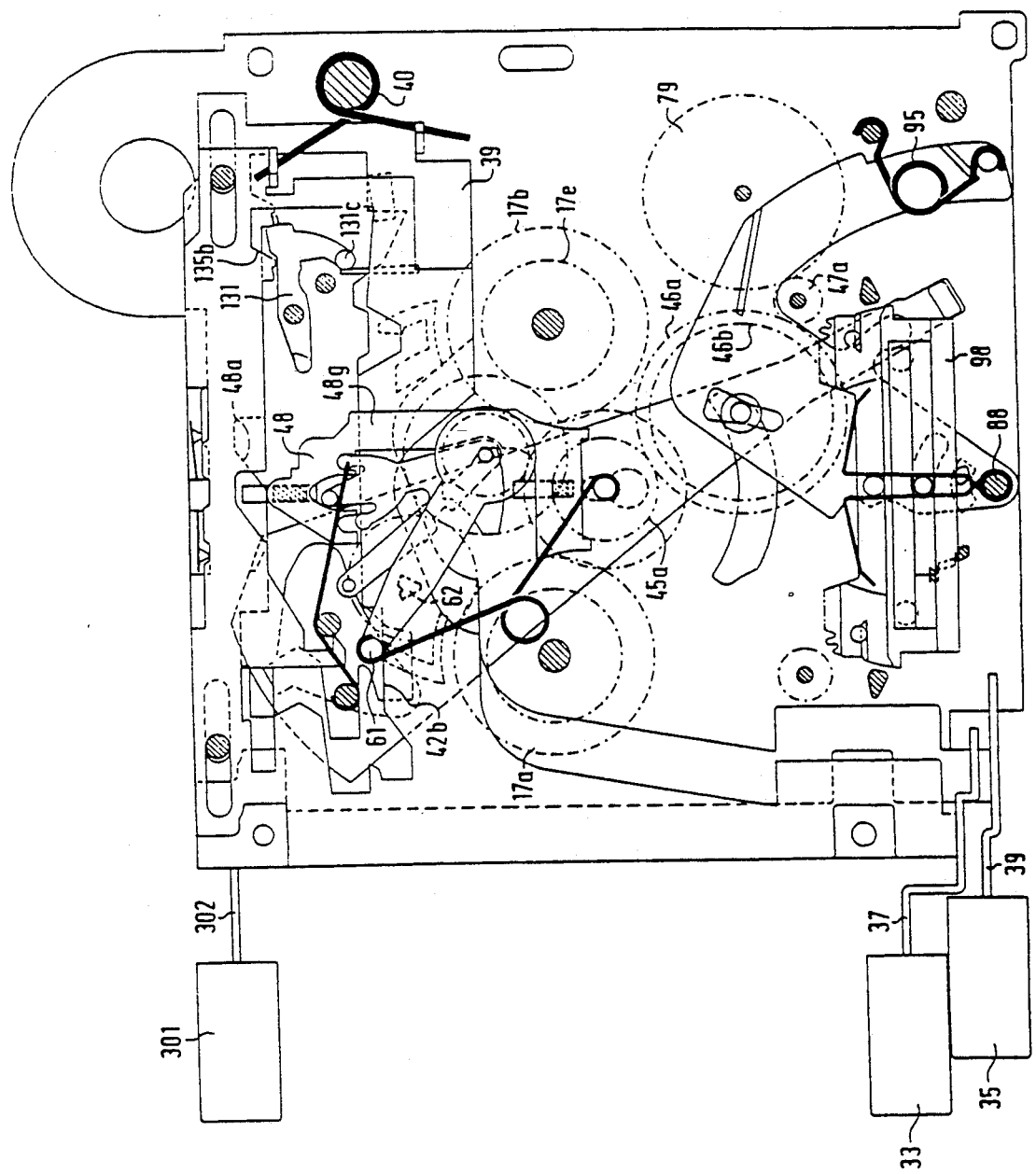
Figure 6B:
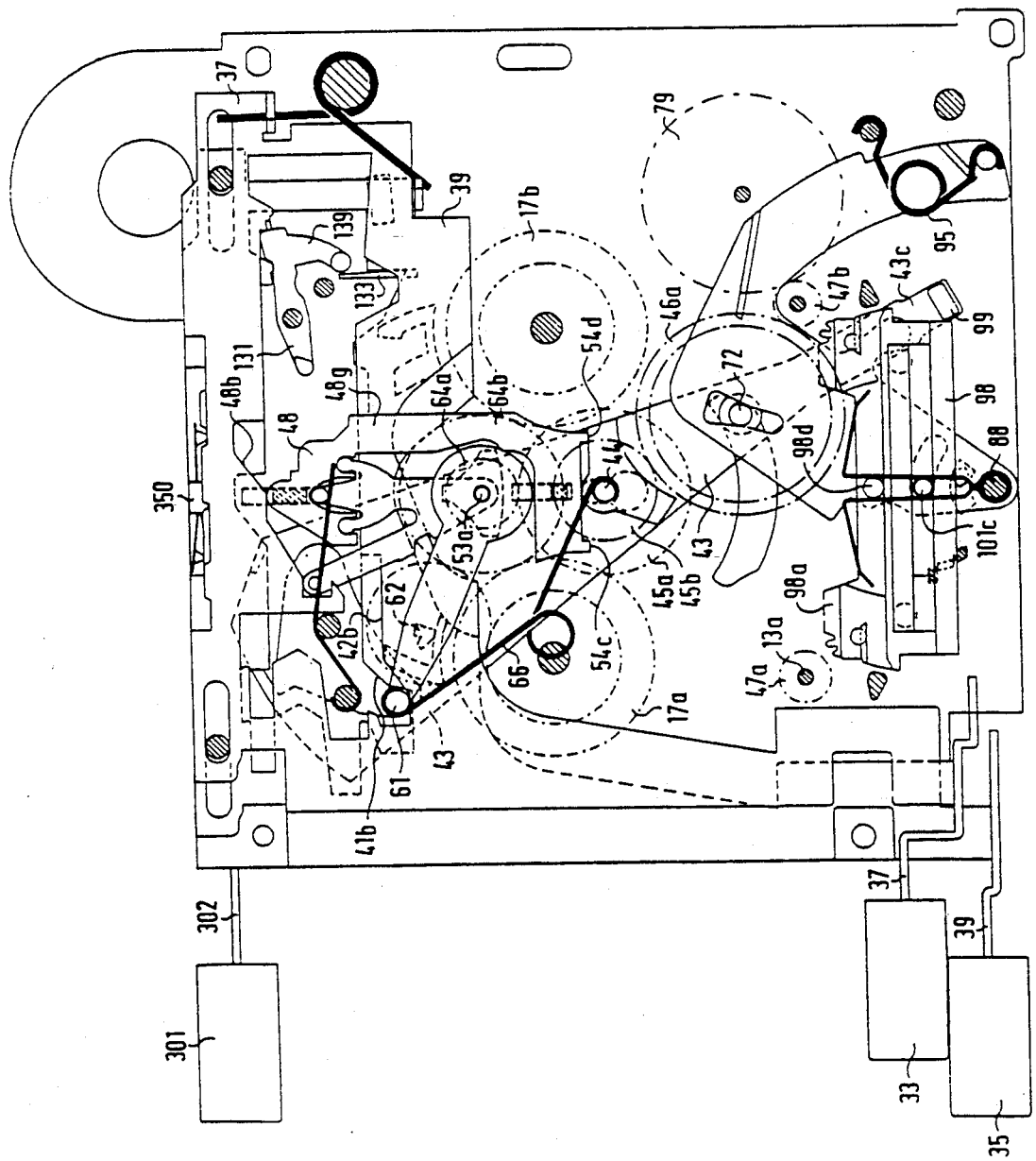

During this pivotal movement of the reversing plate 87 from the position shown in FIGS. 1 to 3 into the position shown in FIGS. 4 to 6 this plate has also moved the central switching lever 43 via the coupling spindle 72 and has thus pivoted its switching lever arm 43c with the rectangular projection 99 beyond the central position. As a result of this the third switching lever 49 is pivoted anti-clockwise because its pin 61 is moved by the switching profile 117a, or 117b in the other direction, of the central switching lever 43. Now the spring 66 no longer pulls the third switching lever 49 towards the real disc 17b but towards the reel disc 17a.

The transport member 98 has now performed its function in the direction reversal from reverse to forward operation and should be returned to its neutral center position. This is achieved by means of a return spring 107. This return spring 107 is a hair pin spring having crossed limbs 107a and 107b. The turn 107e of the return spring 107 surrounds the reversing spindle 88 which is fixedly connected to the chassis. In the rest position the actuating pin 101c arranged on the actuating member 503 and a coupling element 98d on the transport member 98 are situated between the limbs 107a, 107b. The limbs 107a, 107b in addition comprise outwardly projecting portions 107c, 107d.

The switching process will be explained with reference to FIGS. 7a to 7d. FIG. 7, in contradistinction to FIGS. 7a to 7d, shows the deck during the change over from forward operation (the reel disc 17b is driven) to reverse operation (the reel disc 17a is driven).

The transport member 98 has been moved to the right in FIG. 7a to 7d and the rack section 98b meshes with the toothed flywheel 47b. The guide pin 101b has reached the end wall 104b in the guide pin groove 102b. As a result of the movement of the transport member 98 by means of the coupling element 98d the limb 107b of the return spring has been moved to the right and is tensioned. The projection 107c cooperates with the pressure pins 110a in such a manner that in the situation as illustrated in FIG. 7a the projection 107c as a result of its engagement against the pressure pin 110a pivots the transport member 98 clockwise about the pin 101c until the guide pin 101b abuts against a tilting groove wall in the tilting groove 103b. As a result of this the teeth 47b and 98b are no longer in mesh.

Figure 7C:
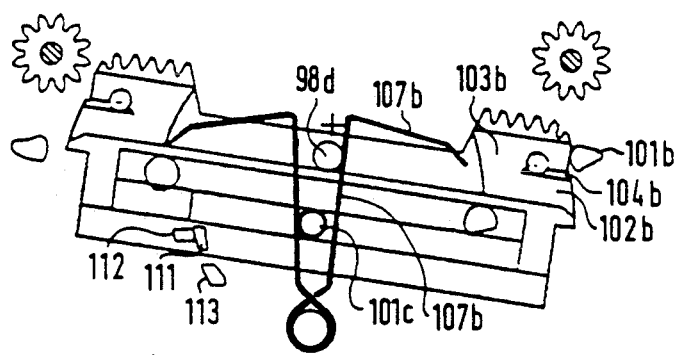
Figure 7D:
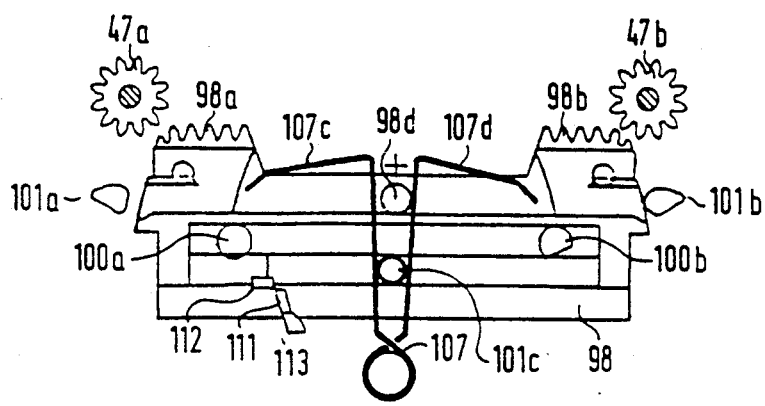
Figure 7E:
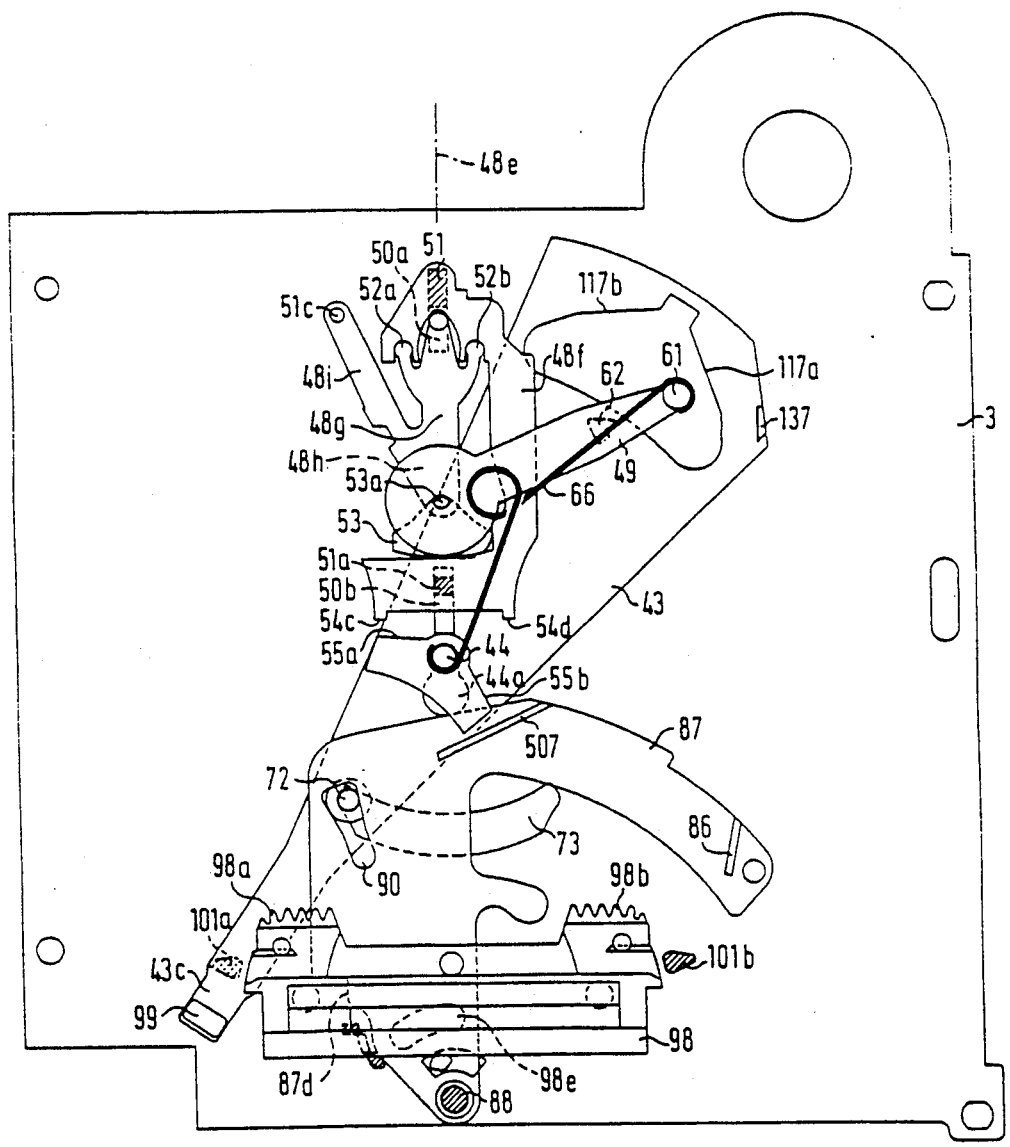
FIG. 7e shows the levers employed for changing the direction of rotation of the deck.

Now the limb 107b of the return spring which has been moved to the right in tension by the transport member projection 98d can again move the projection 98d to the left, causing the guide pin 101b to leave the tilting groove 103b (FIG. 7c).

The transport member 98 comprises a stop 111 which cooperates with guide members 112, 113 which are fixedly connected to the chassis. When the transport member 98 returns to the left the stop 111 abuts against the guide member 112 before the center position is reached. Since the return spring limb 107b then still exerts a force on projection 98d the transport member is pivoted back out of its pivoted position into the non-pivoted position. In this exactly aligned position (FIG. 7d) the stop 112 no longer has any effect and the transport member is moved into the center position under the influence of the return spring.

The reversal of the direction of tape traction at the end of the tape from the fast winding mode in principle precedes in the same way. The only difference resides in the start of the reversing process. When the end of the tape is reached in the play mode the stationary wheel 46b initiates the reversal because during tape stoppage it does not exert a return force on this reaching arm 75 and the control pin 85 ultimately pivots the reversing plate 87 clockwise as a result of its abutment against the stop surface 86. In the fast winding mode this mechanism is bypassed. As in the fast winding mode, the motor drive is not disengaged from the reel disc by a coupling. The torque exerted on the drive wheel 46a when the reel is blocked at the end of the tape is significantly higher than in the play mode. Consequently, at the end of the tape when for example the reel disc 17a stops in the fast-winding mode each self-disengaging mechanism 47a, 46a and 47b, 46a respectively is disengaged against the force exerted by the spring 95. Herein "self-disengaging" is to be understood to mean that the teeth of the flywheel toothed-wheel 47a, 47b and the toothed drive wheel 46a meshing therewith are pressed apart by the flywheel toothed-wheel 47a, 47b, which continues to rotate, because torque exerted by the driving flywheel toothed-wheel 47a, 47b is larger than the oppositely acting torque of the central switching lever, which is provided by the reversing plate 87 and its spring 95. This disengagement is attended by a small pivotal movement of the central switching lever 43 in the anti-clockwise direction in the case of stoppage in the reverse mode and in the clockwise direction in the case of stoppage in the forward mode. This pivotal movement of the switching lever 43 results in the rectangular projection 99 abutting against the transport member 98 and moving this member so far that the rack section 98b (in the case of stoppage in the reverse mode) meshes with the right-hand toothed flywheel 47. Subsequently the reversing process proceeds in the same way as already described for reversal at the end of the tape from the reverse mode into the play mode (FIGS. 4 to 6).

In order to ensure that when the end of the tape is reached in the fast winding mode the entire fast winding mechanism comprising the primary coupling wheel 46a, the intermediate wheel 45 and the fast forward wheel 64 or the fast reverse wheel 65 remains blocked until as a result of the pivotal movement of the central switching lever 43 the transport member 98 has been brought in mesh with the relevant flywheel 47a/b, it is necessary that the fast winding wheel, which is in mesh with the reel disc 17a or 17b, is kept in mesh. For this purpose the pins 61 and 62 have been provided on the third pivotal lever 49, which in the case of fast winding starting from the reverse play mode cooperate with the FRW latching profile 115 or the FFW latching profile 39g on the chassis and in the case of fast winding starting from the forward play mode cooperate with the FRW latching profile 37f on the FRW rod 37 and with the FFW latching profile 39f on the FFW rod. Latching is effected in that the meshing forces of the intermediate wheel 45 always pivot the pivotable section 38g of the second switching lever 48 in the direction in which the third switching lever 49 points when the end of the tape is reached. As a result of this the pin 62 engages underneath the FRW latching contour 115 in the case of fast winding starting from the reverse play mode and the pin 61 engages against the FRW latching profile 37f in the case of fast reverse winding starting from the forward mode, so that a further pivotal movement of the pivotable section 48g of the second switching lever 48 is inhibited and the teeth remain in mesh. If after meshing of the transport member toothed sections 98a and 98b as a result of the consequent movement of the central switching lever 43 and hence of the double coupling wheel 46 the relevant toothed flywheel 7a/b and the primary coupling wheel 46a become disengaged, the talk which rotates the pivotable section of the second switching lever 48 will cease and the FW wheels will be unlocked under the influence of the return spring force exerted by the spring 66. The third switching lever 49 can then be changed over to the other side during the change over of the central switching lever 43.

The stop 51c on the pivotable section 48i of the switching lever also serves to preclude incorrect operation. In the case that the user of the deck keeps the FRW button depressed at the very instant of changing over the stop 51c will engage a latching profile 37k of the FRW rod while the button 33 is in the depressed position. Thus, it is achieved that if during change-over the third switching lever 49 is lifted out of its FRW latch, which comprises the pin 62 and the FRW latching profile 39g (REV operation) and the pin 61 and the FRW latching profile 37f (NOR operation), the force exerted by the spring 66 can pivot the pivotable section 48g of the second switching lever 48 only so far that the FFW wheel does not mesh with one of the reel discs 17a, 17b.

Moreover, during the pivotal movement of the central switching lever 43 the fast-winding rods 37, 39 are released in that an actuating portion on the central switching lever 43 abuts against a release pin 131c of a latch 131 and thereby rotates this latch 131 clockwise.

FORWARD PLAY OPERATION

FIGS. 4a and b show the relative positions of the parts of the playing mechanism in the forward play mode. Both fast winding buttons are in the released positions. The flywheel toothed-wheel 47b drives the drive wheel 46a, the intermediate wheel 45, the driven wheel 46 and the reel disc 17b. The third switching lever 49 has been moved to the left-hand side and the switching lever 43 has been pivoted anti-clockwise.

FAST FORWARD WINDING IN THE FORWARD PLAY MODE

FIGS. 5a and 5b show the position of the deck during fast forward winding starting from the forward play mode. The functions correspond to those in FIG. 2 but now the central switching lever 43 derives the drive from the right-hand flywheel toothed-wheel 47b. When the button 35 for fast forward winding (SVL) is depressed the actuating profile 48a of the push-button rod 39 presses the second switching lever 48 and the actuating heads 54c, 54d inwards. The actuating heads 54c, 54d then abut against the edges 55a, 55b of the central switching lever 43 in the proximity of the central spindle 44. At the same time the guide pin 53a on the pivotable section 48g of the switching lever 48 is pivoted to the right in the triangular opening 53 in the chassis. When the push-button rod 39 is moved inwards the pin 61 is situated on the guide profile 42b, so that the teeth of the fast reverse winding wheel 65 do not mesh with the reel disc 17a. Upon depression up to the stop the guide pin 53a on the pivotable section 48g of the second switching lever 48 has been pivoted anti-clockwise about the head portion 52b against the right-hand inner edge of the triangular opening 53. As a result of this the central switching lever 43 has been pivoted slightly clockwise. The driven wheel 46b of the double coupling wheel 46a, b has been withdrawn from the right-hand reel disc 17b and, instead, the large toothed wheel 64b has meshed with the toothed wheel 17e of the right-hand reel disc 17b, the force being transmitted from the double coupling wheel 45a, b to the small toothed wheel 64a of the toothed-wheel set 64a, b and, via the large toothed wheel 64b, to the toothed wheel 17e of the reel disc 17b. Fast forward winding can be discontinued by pressing the push-button 33 for fast reverse winding. The release profile 135b of the push-button rod 37 then urges the pawl 131 back into its central position.

FAST REVERSE WINDING IN THE FORWARD PLAY MODE

FIGS. 6a shows the situation for fast reverse winding in the forward play mode. Fast reverse winding can be started by depressing the button 33 with the associated push-button rod 37. When the button 33 is depressed the actuating profile 48b presses the second switching lever 48 and its actuating heads 54c, 54d outwards and the pin 61 moves past the guide profile 42b. A pivotal movement of the section 48g of the second switching lever 48 is inhibited because the pivotal section 48g of the second switching lever 48 is held on the guide profile 41b of the push-button rod 39 by means of the pin 61. The pivotable section 48g of the second switching lever 48 actuates the third switching lever 49 during its inward movement. The actuating heads 54c, 54d press against the edges 55a, 55b of the switching lever 43. The central switching lever 43 is pivoted clockwise and is at the same time moved inwards in the slot 44a. The drive wheel 46b of the double coupling wheel 46a, b is thus disengaged from the right-hand reel disc 17b. In the fast reverse winding mode (SRL) which is now operative the flywheel toothed-wheel 47b rapidly drives the left-hand reel disc 17a via the drive wheel 46a of the double coupling wheel 46a, 46b, the intermediate wheel 45, the small fast-winding toothed wheel 64a of the fast-winding toothed-wheel set 64a, b, the large fast-winding toothed wheel 64b of the fast-winding toothed-wheel set 64a, b, and the fast reverse wheel 65. Fast reverse winding is discontinued by depression of the button 35 for fast forward winding. The pretensioning and release profile 135a of the other push-button rod 39 presses the latch 131 back into its central position.

FAST WINDING BUTTON LATCHING

The push-button rods 37, 39 have been provided with a latching mechanism 130, which retains the actuated push-button rod 37, 39 in its depressed position until the depressed position is cancelled by actuation of the relevant other push-button rod 37, 39. The outward movement upon the release is produced under the influence of the pressure springs 40, which constantly urge the push-button rods 37, 39 in the outward direction. The latching mechanism 130 comprises the rod-shaped latch 131, which is pivotable about a spindle 132 which is supported in the chassis plate 3. At one end the latch 131 comprises an arm 139 against which a spring 133 exerts its pressure. The depressed push-button rod 37, 39 pivots the latch 131 against the force of the spring 133 via the relevant pretensioning and release profile 135a/b in such a manner that the depressed button can move past the latch until the rear 131b of the latch 131 engages behind one of two latching projections 136a, b and can thereby latch the depressed push-button in the depressed position. FIGS. 2, 3, 5 and 6 show such latched positions for the two push-button rods 37, 39.

Unlatching can be effected in that the user of the apparatus presses the non-latched button, in such a manner that the relevant profile 135a, b of the releasing button presses against the release profile 131d of the latch 131, causing the latch 131 to be pivoted and to be released.

Figure 7F:
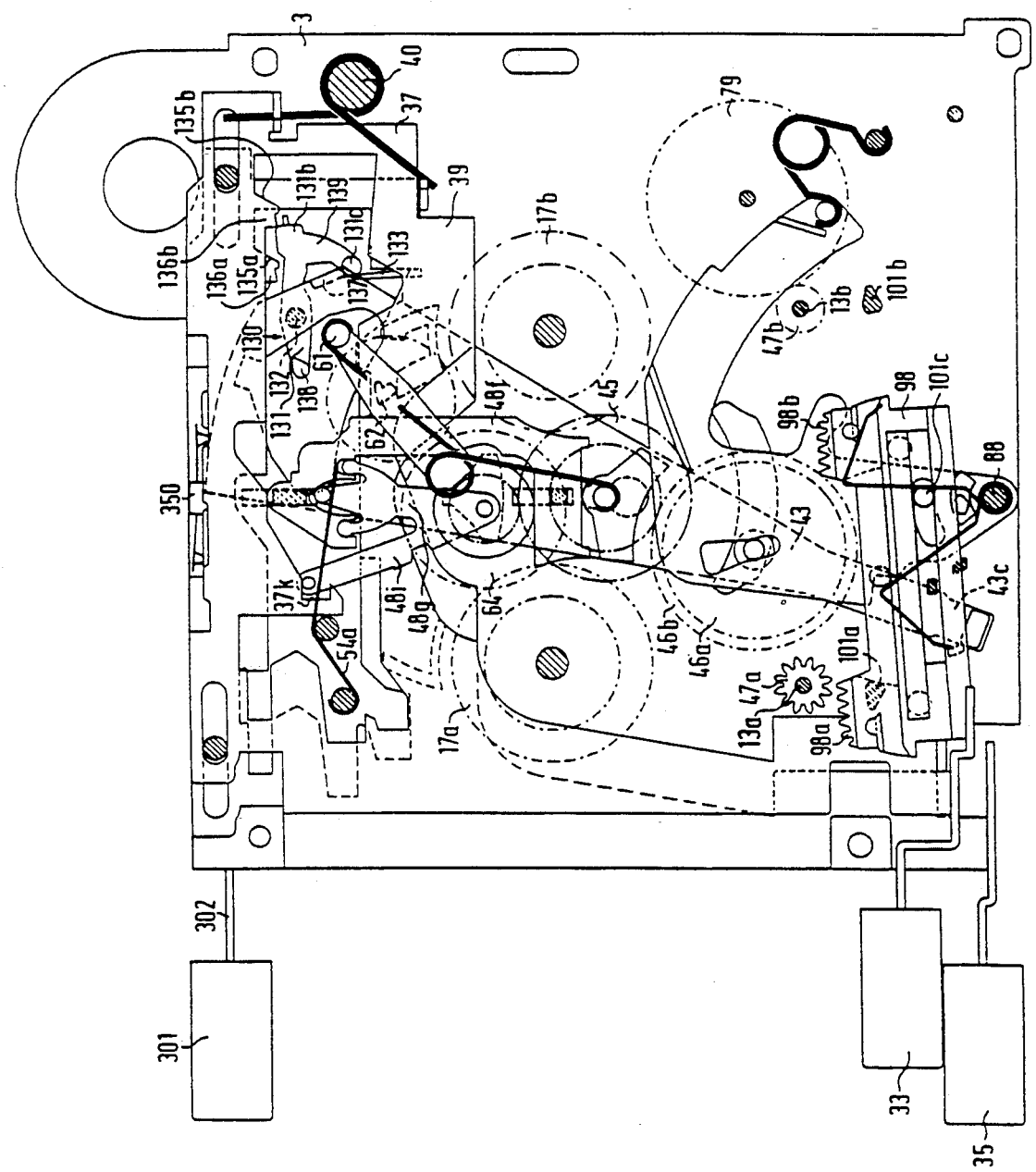
FIG. 7f shows the deck during the unlocking process at the tape ends during the change-over from fast forward in the normal mode (FFW-NOR) to reverse play (REV)

When the push-button rods 37, 39 are in the depressed positions in the fast winding mode the latching mechanism is released upon reversal of the tape-pulling direction by means of the central switching lever 43, which comprises an actuating portion 137. The actuating portion 137 cooperates with the release pin 131c arranged on the latch 131. If in the situation illustrated in FIG. 7f the central switching lever 43 moves over the latch 131 and with its actuating portion 137 past the release pin 131c the release profile 137 will pivot the latch 131 into the central position shown in FIG. 7 and the push-button rod which has just been depressed is unlatched and can move outwards. In the situation illustrated in FIG. 7f the actuating portion 137 has just pivoted the release pin 131c and hence the latch 131 in the clockwise direction.

HEAD-MOUNTING-PLATE ACTUATION

Figure 8A:
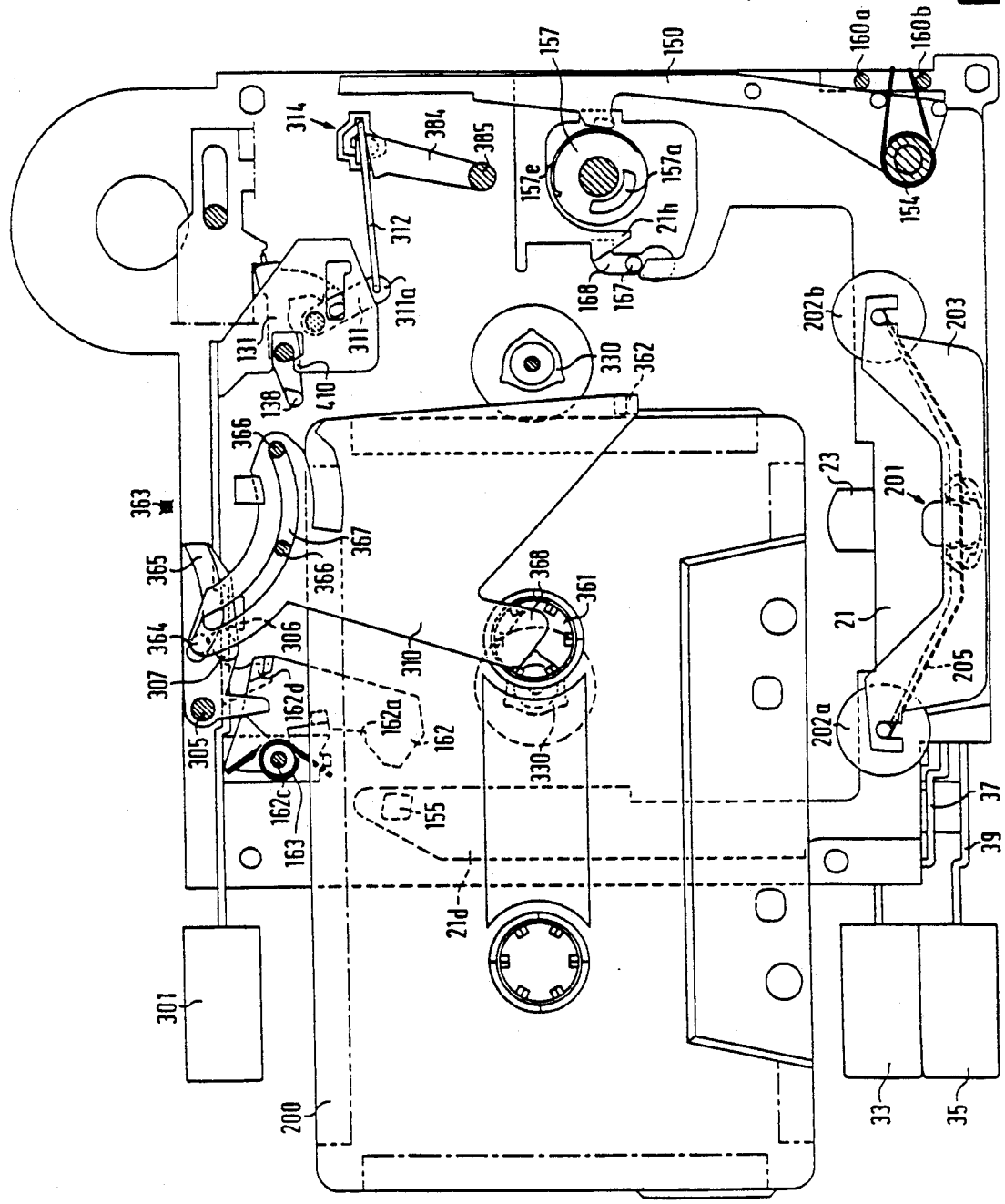
FIG. 8a shows the deck with the head-mounting plate in the ejection position.

FIGS. 8a, b and c show a mechanism for actuating the head-mounting plate in the ejection (Eject), the playing and the fast winding modes. The head-mounting plate 21, which carries the sound head 23, is movably supported in guide means 151 by means of a traction lever 150, said guide means ensuring a parallel movement of the head-mounting plate relative to the tape guide path. The guide means 151 guide the head-mounting plate 21 in a direction 152 relative to the magnetic tape 153 to be scanned (FIG. 8b) in a magnetic-tape cassette 200. A head-mounting-plate spring 21f tends to pull the head-mounting plate 21 out of the play position, in which the sound head 23 is positioned against the magnetic tape 153, into the ejection position via the fast winding or Standby position.

At its longitudinal ends 21b, 21c the head-mounting plate 21 comprises limbs 21d, 21e. The limb 21d carries a projection 155 which cooperates with a catch lever 162. The limb 21e carries the traction lever 150.

The switching wheel 79 can be coupled to a traction wheel 157, which is supported in the chassis. The traction wheel 157 has a control profile 157a, which cooperates with the traction lever 150. Moreover, the traction wheel 157 comprises a toothed segment 157b and an annular blocking wall 157c at its outer circumference 157d. The traction wheel has a flat surface 157e.

When the head-mounting plate 21 is in the ejection position while the drive motor 9 is stationary (FIG. 8a) the traction lever 150 is pivoted anti-clockwise under the influence of the force exerted by the traction lever spring 154, in such a manner that it is pivoted towards the traction wheel 157 and is applied to the stop wall 157d. For this purpose the traction lever spring 154 is constructed as a leg-spring whose legs 154a, 154b cooperate both with the chassis projections 160a, 160b, which are disposed in line with one another in the direction of movement of the head-mounting plate adjacent the traction lever 150, and with traction-lever projections 161a, 161b on the traction lever 150. The spring turns 154c of the traction-lever spring 154 surround a dome-like bearing ring 150d of the traction lever 150. A bearing spindle 150a of the traction lever 150 is arranged on the head-mounting plate 121 and extends through said ring 150d. In the withdrawn ejection position the leg 154b is positioned against the chassis projection 160b and the leg 154a is positioned against the traction-lever projection 161a, thereby urging the traction lever 150 towards the traction wheel 157.

When the deck is started electrically, i.e. when the capstans 13a, 13b are set into rotation, the traction wheel 157 should pull the head-mounting plate 21 into the play position. For this purpose a coupling should be established between the switching wheel 79 and the traction wheel 157, which should be released after the head-mounting plate 21 has been set into the play position. For these coupling and release operations there is provided an actuating spring 166 having a first limb 166a and a second limb 166b. The turn 166c of the actuating spring 166 surrounds a pin 167, which is guided in an L-shaped slot 168 in the chassis and which is movable by the head-mounting plate by means of two actuating edges 21g and 21h provided on the limb 21e. A portion 168a of the L-shaped slot 168 serves for latching the pin 167.

The first leg 166a of the actuating spring 166 is supported on the chassis. The second leg 166b lies against a flat surface 157e provided on the cylindrical wall of the traction wheel. Thus, the traction wheel 157 always tends to rotate in such a way that its flat surface 157e is oriented parallel to the second leg 166b of the actuating spring 166. The pin 167 has moved inside the L-shaped slot 168 in such a way that it lies against the actuating edge 21h on the head-mounting-plate limb 21e. Since the turn of the actuating spring 166 is attached to the pin 167 the second limb 166b will be oriented in such a way in this position that it rotates the traction wheel until the teeth mesh with the switching wheel 79.

When a cassette is inserted the motor 9 is started and the take-up reel of the cassette 200 and the capstans 7a, 7b as well as the traction wheel 157 begin to rotate. Since the traction lever 150 engages against the blocking wall 157c of the traction wheel 157 the traction lever 150 cannot immediately come within the operating range of the traction-wheel projection 157a. The traction wheel begins to rotate in the anti-clockwise direction, the traction lever 150 sliding off the annular blocking wall 157c which moves away. Said lever then engages against the cylindrical wall of the traction-wheel projection 157a so that it cannot be moved any further. The traction wheel 157 continues to rotate, the traction lever 150 slides off the cylindrical wall of the traction-wheel projection 157a, and it is not until now that this lever can come within the range of the traction-wheel projection 157a. After approximately half a revolution of the traction wheel 157 the movement of the head-mounting plate into the play position begins. The spool of the cassette is rotated during said entire rotation of the traction wheel 157, in order to remove any tape loops before the head-mounting plate 21 is moved.

By means of its projection 157a the traction wheel 157 moves a projection 115b of the traction lever 150, in order to move the head-mounting plate 21 forward into the play position against the action of the spring 21f of the head-mounting plate. In the play position the projection 155 of the limb 21d engages a play recess 162a in a catch lever 162, which lever is pivotably supported on the ejection rod 302 and is urged in the clockwise direction by a catch-lever spring 163. The play recess 162a in the catch lever is self-locking. Thus, the head-mounting plate 21 is held in the play position. The chassis projection 160a presses against the leg 154a of the leg spring 154 and pivots the traction lever 150 out of the operating range of the traction wheel 157. If the head-mounting plate 21 should return from the play position to the ejection position the catch lever 162 with the retracted ejection rod is moved in the inward direction and liberates the head-mounting plate, so that the spring 21f of the head-mounting plate can withdraw this plate into the ejection position. However, if the plate should not return into the ejection position but to a fast-winding position, which corresponds to a stand-by position in which the head-mounting plate 21 is withdrawn only partly, the catch lever 162 is blocked in the fast-winding position after a short pivotal movement in the anti-clockwise direction. The projection 155 engages in a fast-winding recess 162b (FIG. 8b). During the change-over to fast winding a projection 401a, b of the depressed fast-winding rod 37 or 39 causes the anti-clockwise pivotal movement in that a limiter pin 162d on the catch lever 162 is pressed away from said projection. The pivotal movement is subsequently limited by a guiding edge 37e, 39e of the depressed fast-winding rod 37, 39 in that the pivotal movement of the limiter pin 162d is limited.

During the standby function the two depressed fast-winding rods 37, 39 take over the displacement and blocking of the head-mounting plate 21 in the fast-winding position.

Figure 8C:
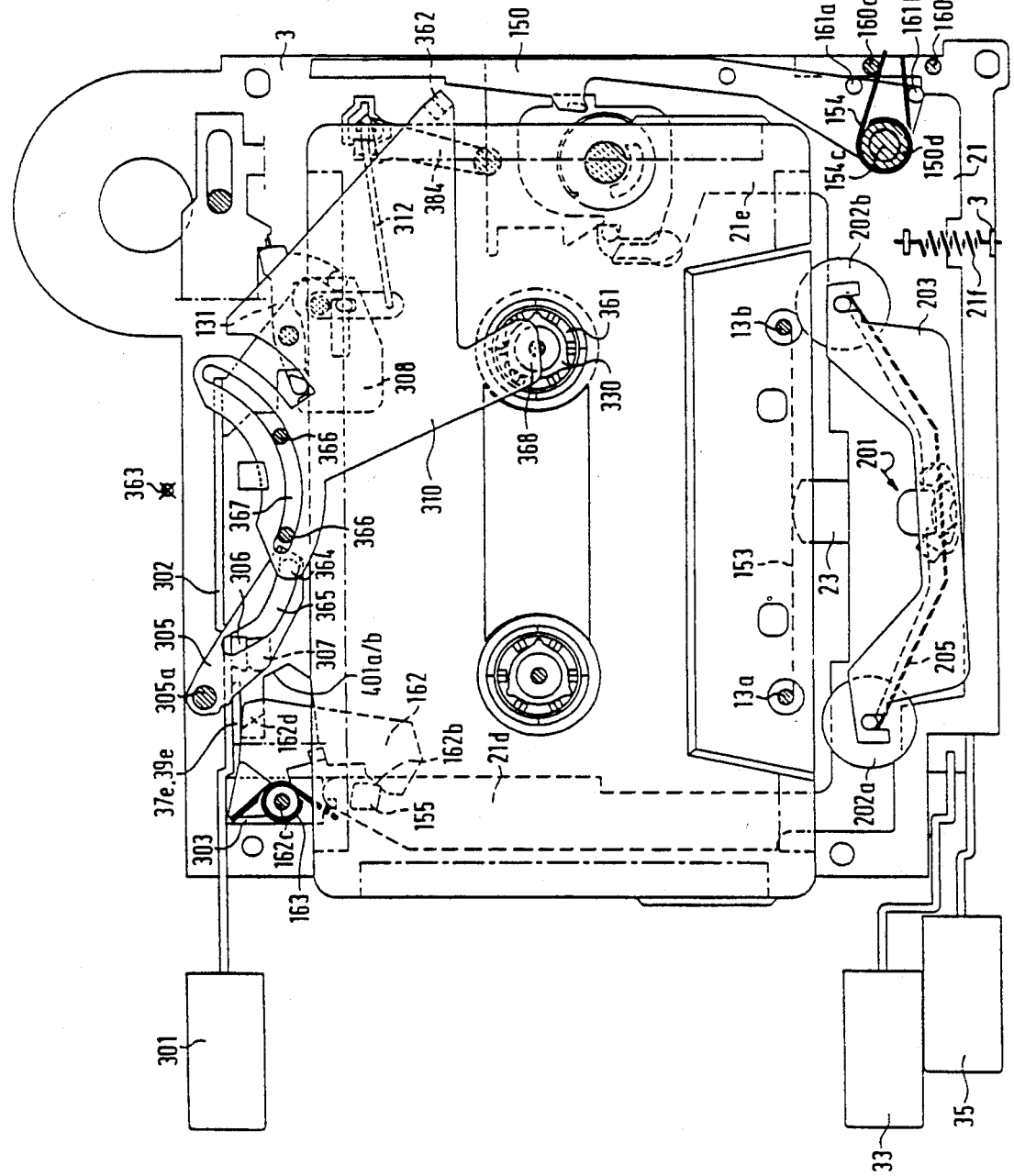
FIG. 8c shows the deck with the head-mounting plate in the fast-winding or standby position.

FIG. 8c shows this fast-winding position of the head-mounting plate 21, in which the traction lever 150 is held in the pivoted position under the permanent pressure exerted on the leg spring 154 by the chassis projection 160a. Regardless of whether ejection (Eject) or restarting of the Play mode is desired the head-mounting plate always returns from the position shown in FIG. 8c into the ejection position in that the catch lever 162 liberates the projection 155. As a result of the return into the ejection position the traction lever 150 is pivoted anti-clockwise into the operating range of the traction wheel 157. If the drive motor of the capstans 13a, 13b is switched off during the return into the ejection position the head-mounting plate 21 will remain in the ejection position. However, if the motor 9 is energized and the capstans 13a, 13b keep rotating the inwardly pivoted traction lever 150 again pulls the head-mounting plate 21 into the playing position and the catch lever 162 locks the head-mounting plate 21 in the playing position by means of the play recess 162a.

PRESSURE-ROLLER ACTUATION

Figure 9A:
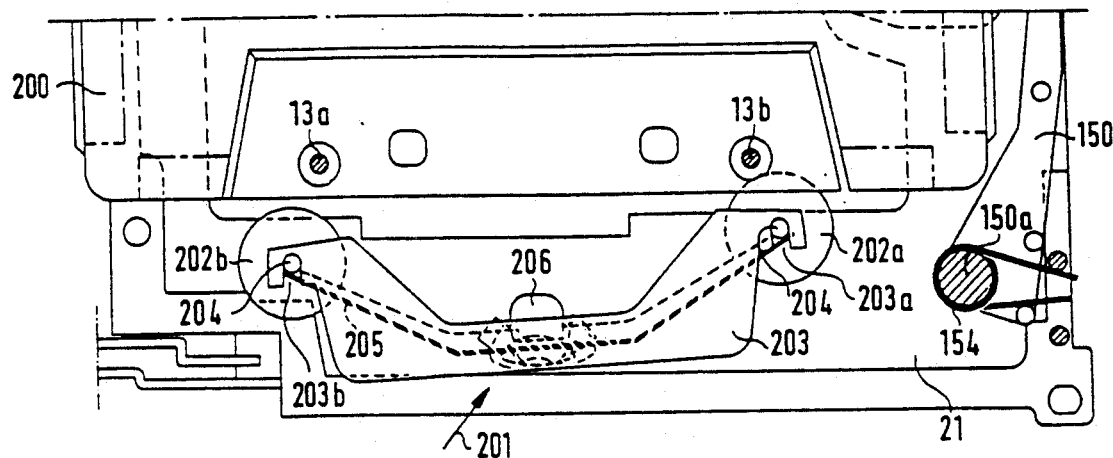
FIG. 9a shows diagrammatically the device for changing over the pressure rollers of the deck.
Figure 9B:
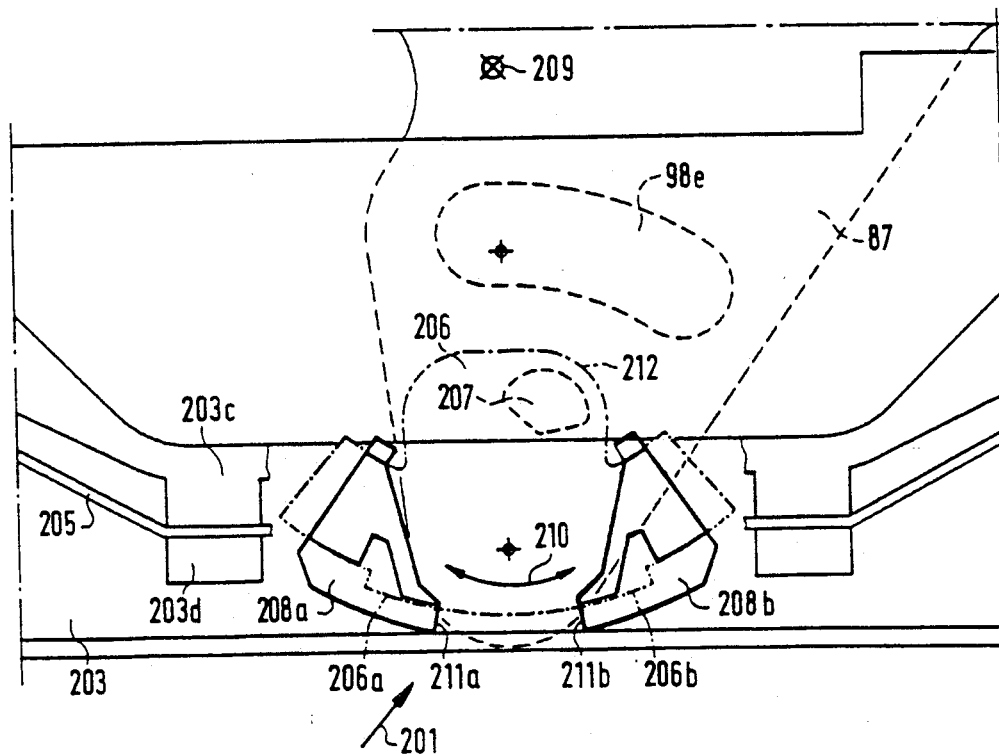
FIG. 9b is an enlarged-scale view of the change-over mechanism shown in FIG. 9a, FIG. 10a shows the positioning-mechanism for the head-mounting plate in the ejection position of the cassette-ejection mechanism.

In addition to the actuation of the head-mounting plate FIGS. 8a to 8c also illustrate the actuating device 201 for the pressure rollers 202a and 202b, which are selectively pressed against the capstans 13a or 13b for the purpose of tape transport. In FIGS. 8a to 8c the tape-transport mechanism has been set to the forward-play direction (recognizable by the broken-line position of the reversing plate 87). FIGS. 9a, 9b illustrate the pressure-roller actuation, the tape-transport-mechanism being set to the reverse play direction. The spindles 204 of the pressure rollers 202a and 202b engage in slots 203a, 203b in a pressure-roller bracket 203. A pressure-spring member 205 urges the spindles 204 of the pressure rollers 202a and 202b towards the capstans 13a, 13b. The pressure-spring member 205 is clamped between clamping members 203c, 203d on the pressure-roller bracket 203.

In order to apply one of the pressure rollers 202a, 202b to the associated capstan 13a, b the pressure-roller member 203 is pivoted or tilted. The pivotal or tilting movement of the pressure-roller bracket 203 will be explained with reference to the enlarged-scale view shown in FIG. 9b. The head-mounting plate 21 has a recess 206 shown in dash-dot lines in FIG. 9b. The reversing plate 87 is rotatably supported on the reversing spindle 88 which is fixedly connected to the chassis. This reversing plate 87 carries a cam 207 which engages the recess 206 in the head-mounting plate 206. The pressure-roller bracket 203 carries profiled portions 208a, b which also cooperate with the cam 207. The pressure-roller bracket 203 is movable around the head-mounting plate 21 about a fictitious pivot 209. This pivot constitutes the center of the arcuate profiles 206a and 206b.

Owing to this arrangement the pressure-roller bracket 203 is pivotable in the directions indicated by a double arrow 210. The pivotal position is dictated by the reversing plate 87. In FIG. 9a the head-mounting plate 21 has been set to the play position and the reversing plate 87 has been set to the reverse-play direction. This means that the pressure roller 202a is applied to the capstan 13h. This is achieved in that the cam 207 has abutted against an edge 211a of the profiled portion 208a. The cam 207 has then pivoted the pressure-roller bracket 203 in the clockwise direction about the pivot 209. The positions shown in FIGS. 9a and 9b correspond to one another. FIG. 9b is merely an enlarged-scale view given for the sake of clarity.

FIG. 8a shows the head-mounting plate 21 in the ejection position and the reversing plate 87 in the forward-play direction. In the ejection position the cam 207 is situated in an area 212 of the recess 206 in the head-mounting plate. The shape in the area 212 is such that the pressure-roller bracket 203 extends parallel to the head-mounting plate 21. Both pressure rollers 202a, b have been withdrawn from the capstans 13a, b.

In FIG. 8b the head-mounting plate 21 has been set to the play position in the forward-play mode and is latched in this position by means of the catch lever 162. Consequently, the reversing plate 87 is in the forward-play position. The pressure-roller bracket 203 presses the pressure roller 202b against the capstan 13b via the pressure-spring member 205. The cam 207 faces the actuating edge 211b of the profiled portion 208b and exerts pressure on the pressure-roller bracket 203 in the anti-clockwise direction. The pressure roller 203b is applied to the capstan 13b.

In the situation illustrated in FIG. 8c, in which the head-mounting plate 21 is in the fast-winding position, the cam 207 does not engage with the edge 211a or 211b of the profiles 208 because the head-mounting plate has receded. As a result of this, the pressure roller 202a, b, which has been applied to the associated capstan, is no longer pressed against the capstan.

LOADING AND EJECTION MECHANISM

Figure 10B:
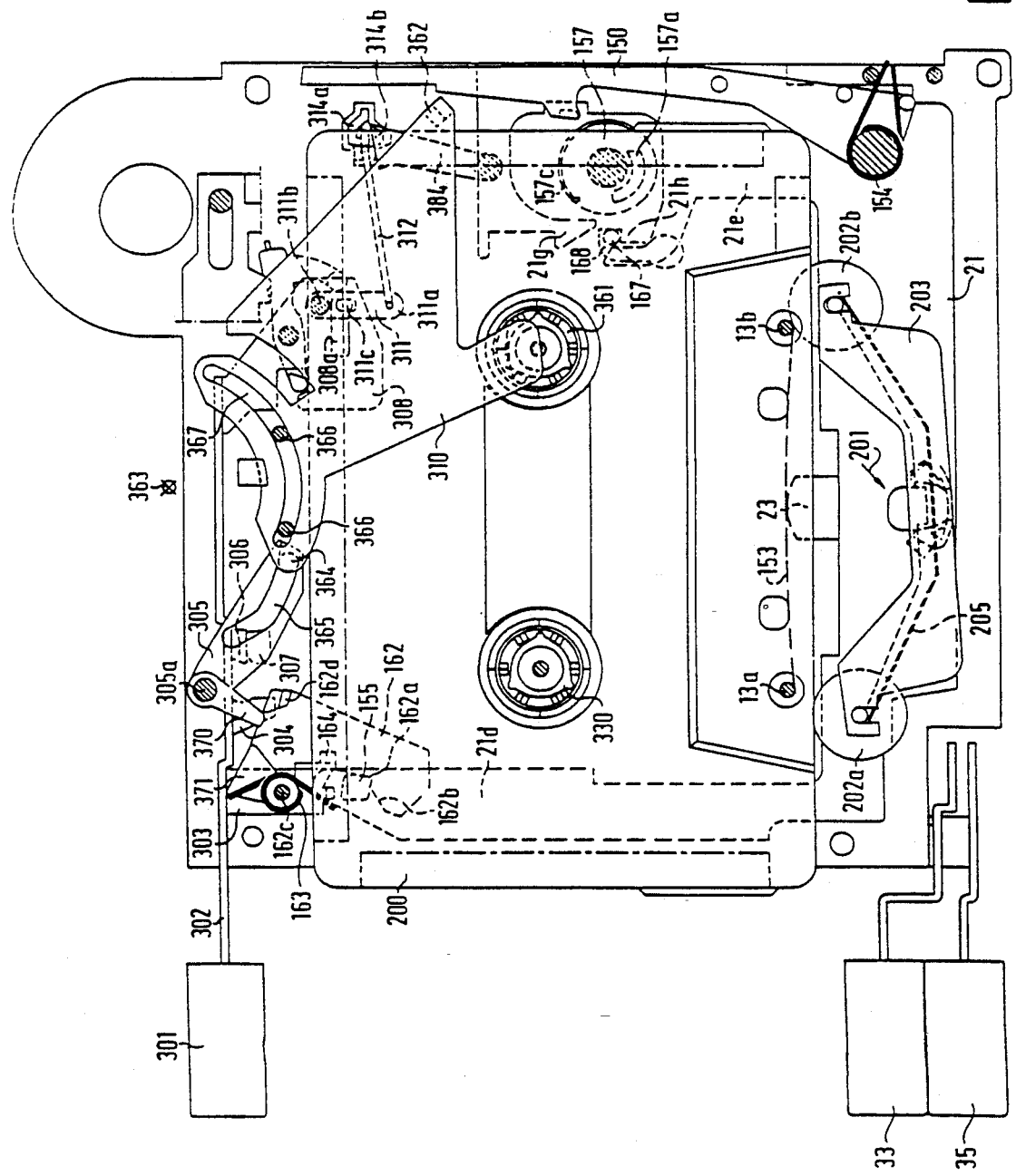
FIG. 10b shows the mechanism of FIG. 10a in the play position.

The deck comprises an ejection button 301 with an ejection rod 302, shown in FIGS. 10a and 10b. The ejection rod 302 carries tongues which serve to perform special functions. A catch-lever tongue 303 carries the catch lever 162. A tongue 304 cooperates with a latching projection 307 of a slotted lever 305, which lever is supported on the chassis in the pivot 305a. A latching tongue 306 cooperates with the latching projection 307 of the slotted lever 305. A multi-function tongue 308 can release the fast-winding buttons and initiate the reversal of the tape-pulling direction. As a further part of the deck FIGS. 10a and 10b show a cassette lever 310 for drawing in and ejecting the magnetic-tape cassette 200.

The cassette lever 310 is pivotable about a virtual pivot 363. Its pivotal support is actually provided by two stationary guide pins 366 on the chassis, which pins extend through an arcuate slot 367 in the cassette lever 310. The curvature of the slot 367 corresponds to the curvature of a circle whose center is constituted by the virtual pivot 363. If the virtual pivot is situated far enough away the curvature of the slot 367 will be comparatively moderate. This reduces the actual length dimension of the cassette lever 310. The cassette lever 310 carries a nose 362, against which a cassette front wall 200c, which faces forward when a cassette 200 is inserted, can abut. During ejection of the cassette 200 this front wall 200c is also used for removing the cassette.

A cassette driver 368 is integral with the cassette lever 310 and is engageable in the hole 361 in a reel hub. Its path of movement about the virtual pivot 363 approximates to a straight line. The cassette driver 368 should be elastic enough to run onto a cassette side wall 200a and subsequently engage the hole 369 in the reel hub 361. As a result of this elasticity it is not unlikely that the cassette driver 368 inadvertently pops out of the hole 369. In order to preclude this there is provided an abutment, not shown. This abutment holds down the driver 368 during the stage of movement in which the driver 368 has engaged and should remain in the hole 369.

The cassette lever 310 has an ejection-lever edge 373 which cooperates with a release pin 138 of the latching device 130. When the release pin 138 is pushed away the ejection-lever edge 373 initiates the release of the fast-winding rods so that the fast-winding rods 37, 39 and, via a driver also the ejection rod 302, can move outward.

The pivotal movement the cassette lever 310 is produced by means of a slotted lever 305 which is pivotable about a stationary pivot. The slotted lever 305 has a slot 365 which is engaged by a pivot pin 364 of the cassette lever 310. The slotted lever 305 also carries a latching projection 307, which cooperates with a latching tongue 306 and a slotted-lever tongue 304 of the ejection rod 302, depending on the direction in which the ejection rod 302 can be moved. The operation of this mechanism will be described in the sections Loading cycle and Ejection cycle.

A single-arm lever 311 is supported on the chassis in the pivot 311b and carries a pin 311c, which is guided by a profile 308a of the multi-function tongue 308 and by means of which it is pivoted about its pivot 311b. The free end 311a of the lever 311 is articulated to a reversing limb 312 carrying a pin 313 which engages a multi-path guide 314 on the chassis. This multi-path guide 314 is shown to an enlarged scale in FIG. 11 and comprises an entry path 314c branching into oppositely directed first and second return paths 314a and 341b. The multi-path guide and its operation will be described in detail in the section Manual reversal.

Figure 12A:
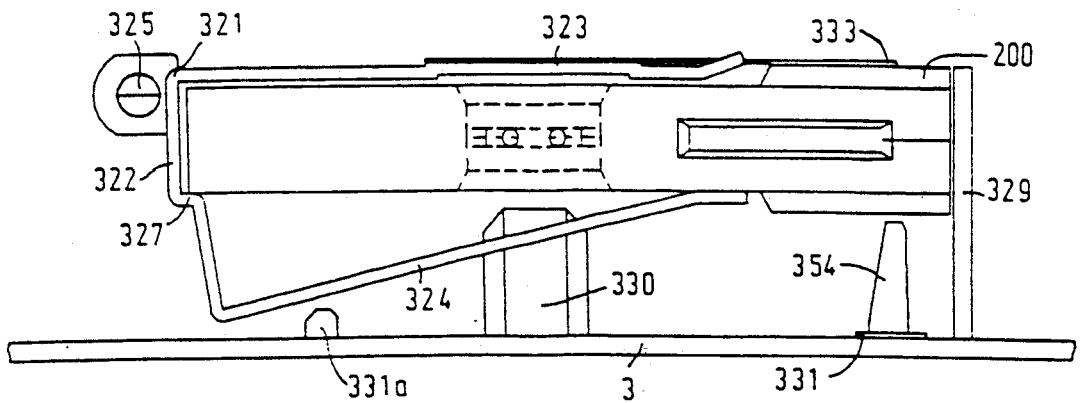
FIGS. 12a to 12c show a loading mechanism for a magnetic-tape cassette in three different functional positions.
Figure 12B:
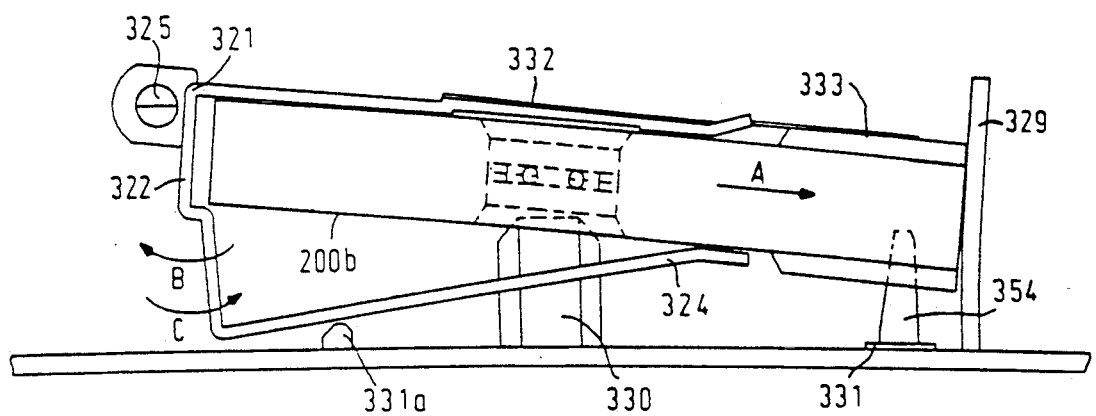
Figure 12C:
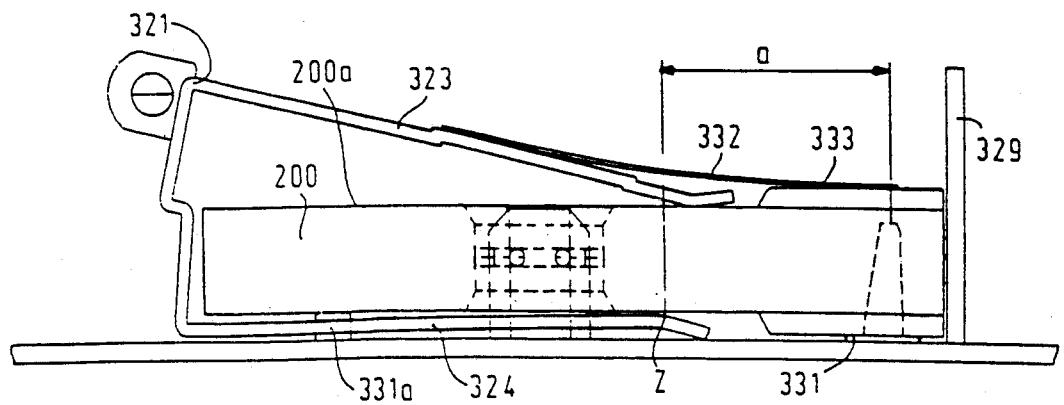

FIGS. 12a to c show in particular the cassette holder 321 of the loading mechanism of the deck. This holder is a sheet-metal part 321 having a transverse holder wall 322 and two holder plates 323 and 324. The cassette holder 321 is pivotable about a spindle 325. The holder plates 323, 324 extend at an angle smaller than 180° to one another. In the loading position the upper holder plate 323 extends substantially horizontally. This enables a magnetic tape cassette 200 to be inserted horizontally into the cassette holder 321 (FIG. 12a). In this loading position the lower holder plate 324 is pivoted upwards. The magnetic-tape cassette 200 is supported on a ridge 327 of the transverse holder wall 322. When the cassette holder 321 is lowered (pivoted about its spindle 325) the ridge 327 is pivoted in the direction indicated by an arrow B. The cassette is then retained by the locating pins 354 and as a result of the shape of these pins it is also pulled in the direction indicated by an arrow A away from the ridge 327 during the downward movement of the cassette (FIG. 12b).

After it has been lowered to a specific extent the cassette 200 is no longer supported on the ridge 327 as a result of this relative movement and assumes the lowered horizontal play position. The magnetic-tape cassette is then supported on a cassette support 331, 331a (FIG. 12c).

The cassette holder 321 is pivoted when the ejection rod 302 is moved via a slotted guide, not shown. A blade spring 332 is secured to the upper holder plate 323. The free end 333 of the blade spring presses against the cassette 200 in the holder 321. In the play position illustrated in FIG. 12c the blade spring 332 is lifted relative to the position shown in FIG. 12a and 12b and thereby exerts pressure on the cassette 200. In this way the cassette 200 is securely held in the play position.

When the cassette 200 is moved from the play position shown in FIG. 12c into the ejection position shown in FIG. 12a the cassette 200 is initially lifted slightly off the lower holder plate 324, causing it to be pivoted clockwise about a point z (FIG. 12c) on the lower holder plate 324 under the influence of the spring 332 until the upper wall 200a of the cassette 200 abuts against the upper holder plate 323 (FIG. 12b). The holder 321 is then pivoted into the position shown in FIG. 12a in the direction indicated by an arrow C in FIG. 12b.

Briefly after the lower wall 200b of the cassette 200 has reached a position above the ridge 327 and has become disengaged from the locating pins 354 a return profile 329 urges the cassette onto the ridge as the holder is pivoted further into the ejection position. The cassette has then again reached its ejection position (FIG. 12a). The cassette 200 can then be moved out of the holder 321 by means of the cassette lever 310.

LOADING CYCLE

As long as the deck is inoperative, i.e. no cassette has been inserted, the three buttons, i.e. the fast-winding buttons 33 and 35 and the eject button 301 with their push-button rods 37, 39 and 302 are in their retracted positions. DE Patent Application P 39 36 076.8 (PHD 89-194) describes a possible method of common retraction. Upon depression the ejection rod 302 has moved the fast-winding rods 37, 39 via an actuating element (not shown). Thus, all the three buttons 33, 35 and 301 are retracted into the apparatus when the cassette 200 is ejected.

If subsequently a magnetic-tape cassette 200 is inserted into the cassette holder 321 the cassette front wall 200c of the magnetic-tape cassette 200 abuts against the nose 362 of the cassette lever 310. The cassette driver 368 engages the hole 369 of the first reel hub 361 of the cassette (FIG. 10a). Subsequently, the cassette lever 310 is forced to pivot anti-clockwise about the virtual pivot 363, the cassette driver 368 being prevented from leaving the hole 369 in that it travels underneath a support on the cassette holder 321. The pivot pin 364 of the cassette lever 310 moves along the slot 365 and pivots the slotted lever 305 clockwise.

The pressure tongue of the slotted lever 305, which pivots clockwise, presses against a projection 371 of the catch lever 162, causing the catch-lever spring 1 63 to be pretensioned in the anti-clockwise direction. The latching projection 307 of the slotted lever 305 moves towards a tip 372 of the latching tongue 306. At the instant at which the latching tongue 307 reaches the tip 372 the ejection-lever edge 373 of the cassette lever 310 abuts against the release pin 138 of the latch 131. As a result of this, the fast-winding buttons 37, 39 are released and are move outwards under the influence of the spring 40 acting upon them. The fast-winding rods 37, 39 then actuate the ejection rod 302 via the actuating element 360. A switch 350 (FIG. 13) for the motor 9 is actuated by the fast-winding rods 37, 39. The motor is started.

The ejection-lever edge 373 of the latching tongue 306 engages against the latching projection 307 of the slotted lever. The latching tongue 306, which moves outward with the ejection rod 302, thus pivots the slotted lever 305 further clockwise. Since the spring 40 moves the ejection rod 302 via the fast-winding rods 37, 39 the spring 40 now pivots the cassette lever 310 up to the end of the loading path on account of the power transmission. Thus, the cassette 200 is pulled in.

The catch lever 162 moves outwards along with the ejection rod 302. The catch lever 162 moves away from the pressure tongue 360 and is liberated. The catch-lever spring 163 now pivots the catch lever clockwise, as a result of which the play recess 162a reaches a position in which it can latch the head-mounting plate 21 in the play position.

By means of a slotted guide, not shown, the cassette holder 321 is pivoted clockwise into the lowered position shown in FIG. 12c, in which the magnetic-tape cassette 200 is engaged by the winding mandrels 330.

During the common outward movement of the fast-winding rods 37, 39 the motor 9 is started via the switch 350 in that both contact pairs 351a, 351b and 352a, 352b are closed. The capstans 13a, 13b are then also set into rotation. The traction wheel 157 then pulls the traction lever 150 together with the head-mounting plate 21 into the play position in a manner as described hereinbefore. The catch lever 162 latches the head-mounting plate in the play position. Playing can now begin.

EJECTION CYCLE

The ejection rod 302 is fully depressed to stop the operation of the deck and eject the magnetic-tape cassette 200. The cassette holder 321 is pivoted into the ejection position shown in FIG. 12a by means of the slotted guide, not shown. The two fast-winding rods 37, 39 are then also moved into the deck by means of the actuating element 360. Since the catch lever 162 is also moved inward via its spindle 162c, which is supported on the catch-lever tongue 303, this lever will liberate the projection 155 of the head-mounting plate 21 and the head-mounting plate is unlatched. Before this unlatching the fast-winding rods 37, 39 have opened the two contact sets 351a, b, 352a, b of the switch 350 (FIG. 9a). The motor 9 has stopped. The head-mounting plate 21, which has been unlocked by the catch lever 162, now moves into the starting and ejection position.

When the ejection rod 302 is moved inward the latching tongue 306 is disengaged from the latching projection 307. This enables the slotted lever 305 to be pivoted in the anti-clockwise direction. This pivotal movement is obtained via the slotted-lever tongue 304, which abuts against the latching projection 307 on the slotted lever 305. The slotted lever 305 pivots the cassette lever 310 clockwise via the pivot pin 364, which engages its slot 365. The driver 368 of the cassette lever together with the nose 362, which abuts against the cassette front wall 200c, moves the cassette 200 outward. In the unloading position the cassette driver 368 has moved out of the supporting area on the cassette holder 321 and is thus no longer latched. This completes the ejection cycle and the cassette can be removed.

Briefly before the ejection position of the cassette-ejection mechanism is reached, the projection 371 of the catch lever 162 abuts against the pressure tongue 370 of the slotted lever 305. As a result of this, the catch lever 162 is pivoted slightly anti-clockwise against the force exerted by the catch-lever spring 163. Thus, the slotted lever 305 and the cassette lever 310 are biassed in the ejection direction.

ELECTRICAL TAPE-DECK SWITCH

Figure 13:
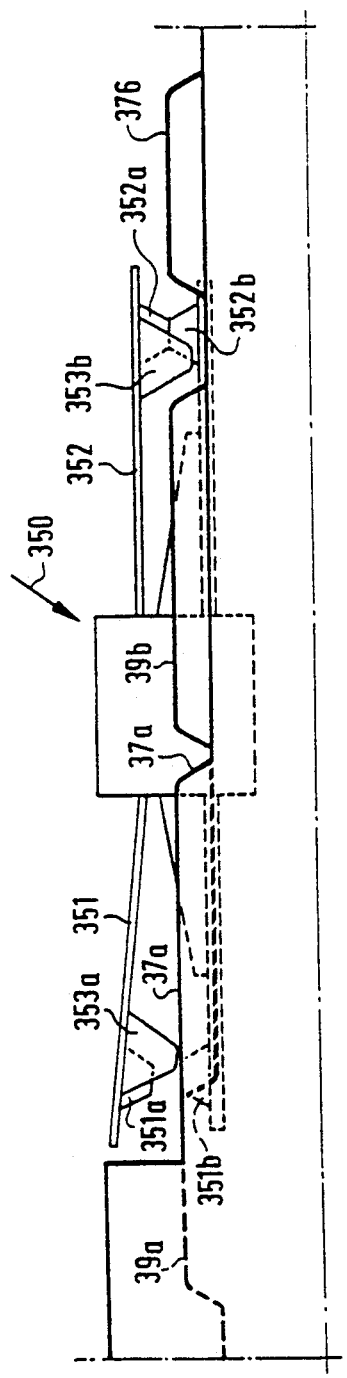
FIG. 13 shows a motor switching device of the deck.

FIG. 13 shows the switch 350, which has been arranged at the location of the push-button rods 37, 39 and which comprises contact pairs 351a, 351b and 352a, 352b, which are spring-loaded towards another. Switching projections 353a and 353b, secured to spring arms 351, 352 carrying the contacts 351a, b and 352a, b, serve for actuating the switch. The switch 350 is actuated via actuating projections 37a, 37b, 39a, 39b secured to the fast-winding rods 37, 39. These projections are arranged offset from one another in such a manner that
a) both contact pairs 351a, b and 352a, b are open when the push-button rods 37, 38 have moved inward equally far at the same time,
b) both contact pairs 351a, b and 352a, b are closed when the push-button rods 37, 39 have moved outward,
c) one of the contact pairs is closed and the other is open when either the push-button rod 37 or 39 is in the inward position,
d) both contact pairs are open when one or both push-button rods 37, 39 is pressed gently.

When both fast-winding rods 37, 39 are in the inward position, for example because they have been moved along upon depression of the ejection rod 302, both contact pairs 351a, b and 352a, b are open and the motor 9 is switched off with simultaneous ejection (of the cassette). The same applies to the stand-by position, in which the two fast-winding rods 37, 39 are in their depressed positions but the ejection rod is not in this position. When all the push-button rods 37, 39, 302 are in their outward positions the switch is closed by means of the two contact pairs 351a, b and 352a, b and the motor 9 is consequently switched off. Depending on which fast-winding rod 37 or 39 has been depressed one of the contact pairs 351a, b or 352a, b is closed as the inward movement proceeds. Thus, it is possible to detect electrically which button has been depressed. This enables the instantaneous fast-winding direction to be indicated on a display. In the manual standby mode both contact pairs 351a, a and 352a, b are open.

If one or both push-button rods 37, 39 have been depressed only slightly at the same time the tape-deck motor 9 is switched off. As a result of this, such an erroneous actuation will have no adverse effects.

MANUAL REVERSAL

Figure 11:
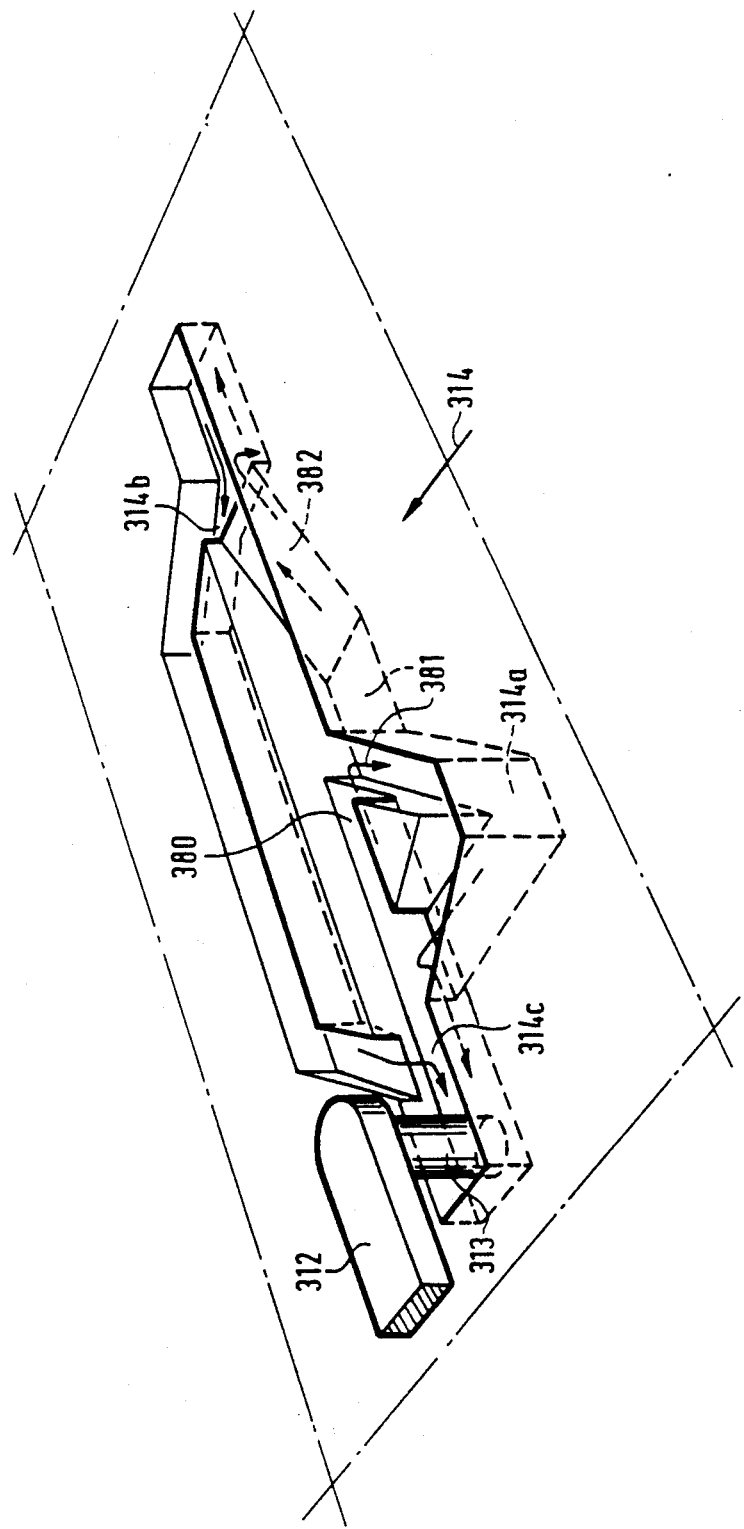
FIG. 11 is an enlarged-scale view of a guide system for guiding a rod for Manual Reverse.
Figure 14:
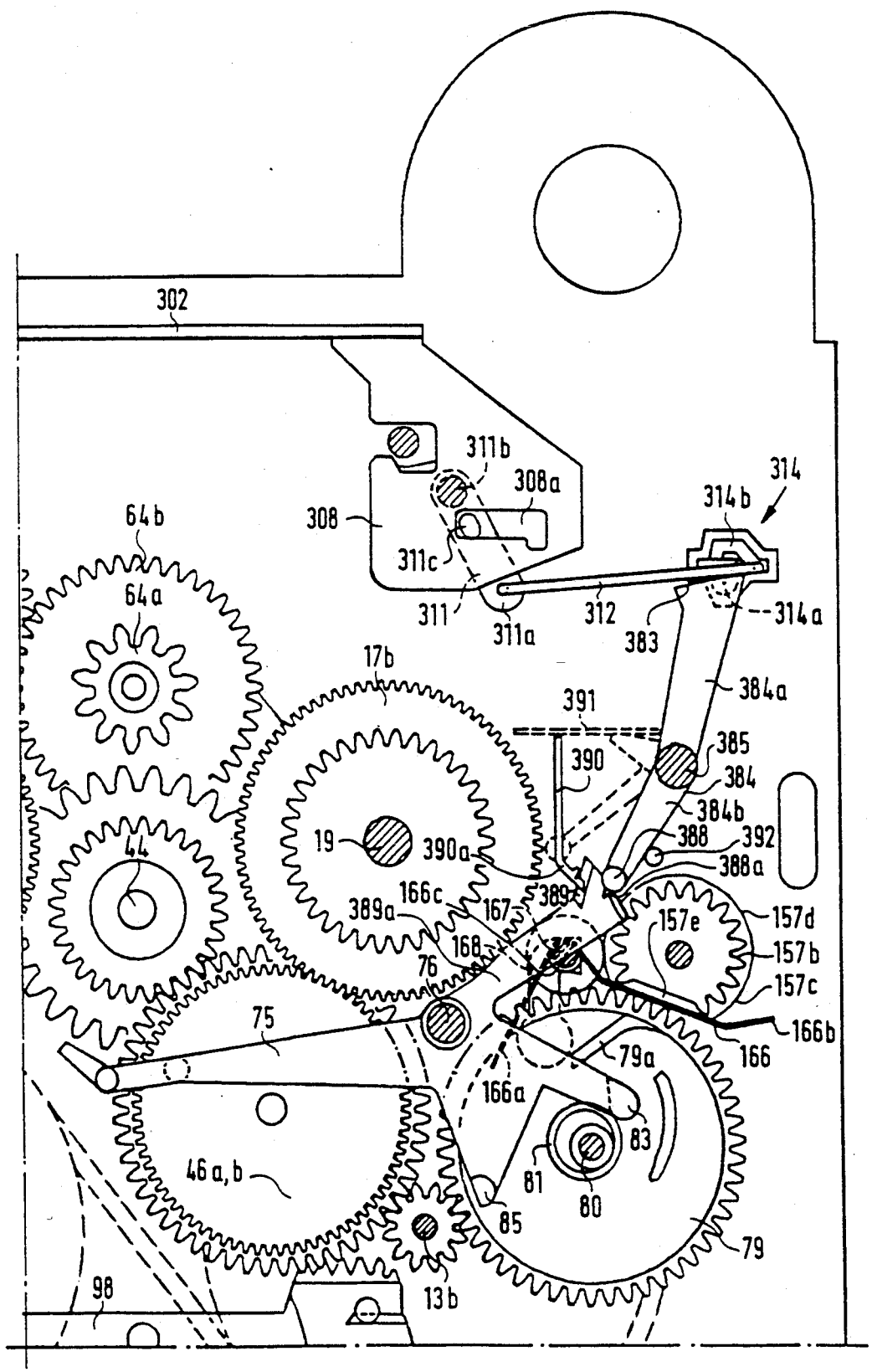
FIG. 14 shows a part of a switching mechanism for manual direction reversal.

The playing direction can be reversed without a change-over of the head-mounting plate 21 both at the end of the tape and, if desired, by means of so-called manual reversal. The direction reversal at the end of the tape has been described already in passing from FIG. 3 to FIG. 4 with reference to the additional FIGS. 7, 7a, 7b. Manual reversal proceeds as follows:

For manual reversal the ejection rod 302 is pushed in partly by means of the ejection button 401. The reversing limb 312 then moves the pin 313 from the entry path 314c, via a first ramp 380, into a first recessed area 381 following this ramp 380 (FIG. 11). Upon pushing in the pin 313 cannot move any further than a second ramp 382, from which it returns into the first recessed area 381. If the ejection button 302 is now released the pin 313 returns into the entry path 314c via the return path 314a. During this return movement in the first return path 314a the pin 313 abuts against an actuating surface 383 of a reversing lever 384, which is pivotable about a reversing-lever spindle 385 supported in the chassis 3. The reversing lever 384 has a plurality of arms. The actuating surface 383 is situated on a first reversing arm 384a. The second reversing arm 384b carries an actuating pin 388 (FIGS. 1 and 14). The actuating pin 388 cooperates with the stop 389 of the control member 77 so as to limit the travel of the control member 77.

When the pin 313 runs onto the actuating surface 383 of the reversing lever 384 the reversing lever 384 is pivoted clockwise and the actuating pin 388 is latched in a notch 390a in the spring 390. The actuating pin 388 has pivoted the control member 77 in the anti-clockwise direction via the arm 389a. As a result of this, the follower 83 runs onto the control surface 84 of the control member 77 and initiates and carries out the reversal process. A reset wall 79a of the switching wheel 79 urges the control member 77 in the clockwise direction. The hook 388a is then unlocked in that the stop 389 pulls the actuating pin 388 out of the notch 390a. A return spring 391 pivots the reversing lever 384 in the anti-clockwise direction against a stop 392 in the chassis. Now playing proceeds in the reverse transport direction.

When the ejection rod 302 is pushed in completely to eject the cassette 200 the pin 313 engages a second recessed area 381a after it cleared the highest point of the second ramp. The pin 313 remains in this recessed area, all the push-button rods 37, 39, 302 are in their depressed positions, the cassette lever 310 has ejected the cassette 200, and the motor 9 has stopped. If again a cassette 200 is inserted the ejection rod 302 moves out again. The pin 313 can now return to the beginning 314c of the entry path via the second return path 314b and the direction reversal is not activated.

MANUAL STANDBY

For manual standby the two fast-winding buttons 33, 35 and the associated fast-winding rods 37, 39 are moved pushed in together. Both contact pairs 351a, b, 352a, b of the switch 350 are then opened. Consequently, the motor 9 is not started. The head-mounting plate 21 is unlocked in that projections 401a, b of the fast-winding rods 37, 39 (FIGS. 1 and 3) abut against a pin 164 on the catch lever 162 (FIG. 8a) and pivot this lever relative to the projection 155 in the anti-clockwise direction against the action of the spring 163. In the fast-winding position the pivotal movement is stopped because a catch-lever projection 371 abuts against the guiding edges 37e, 39e of the fast-winding rods 37, 39. In this position the catch lever 162 is locked against pivotal movement between the projections 401a, b and the edges 37e, 39e. The projection 155 of the receding head-mounting plate 21 engages the fast-winding recess 162b in the catch lever (FIG. 8c). As a result of the disengagement of the head-mounting plate 21 the cam 207 of the reversing plate 87 is leaves the actuating edge 211a or 211b of the pressure-roller bracket 203. Both pressure rollers 202a and 202b are consequently lifted off the capstans 13a and 13b respectively. Thus, the stand-by position is reached, in which both fast-winding rods 37, 39 are locked in the depressed position by the latch 131. Manual stand-by is cancelled by pushing the ejection rod 302 inwards over a comparatively short length, such that the pin 313 not yet reaches the first recessed area 381a (FIG. 11), in that a profile 410 on the multi-function tongue 308 presses the latch 131 into the release position via the release pin 138 of this latch. As a result of this, the push-button rods 37, 39 move outwards and the switch 350 is closed again. The motor is started. The guiding edges 37e, 39e liberate the catch lever 162 so that this lever can pivot through its entire pivotal range. The restoring force exerted by the spring 21f of the head-mounting plates pulls the projection 155 out of the fast-winding recess 162. The catch lever 162 is pivoted away in the anti-clockwise direction. The head-mounting plate 21 moves back into the ejection position. Now the starting process described above follows, in which the motor-driven movement of the head-mounting plate 21 into the play position via the traction lever 150 is performed.

FAST WINDING

In order to enable the fast-winding process already described with reference to FIGS. 2, 3 as well as 5 and 6 to be carried out, the head-mounting plate 21 should be returned to its fast-winding position. To start a fast-winding process (as already explained) one of the fast-winding buttons 37 or 39 is depressed. The catch lever 162 is then pivoted in the anti-clockwise direction against the action of the spring 163 by one of the projections 401a or 401b on the relevant fast-winding rod 37 or 39, which projection abuts against the pin 164. The guiding edge 37e or 39e of the activated fast-winding rod 37 or 39 blocks the pivotal movement of the catch lever 162 when the fast-winding position is reached.

The inward movement of the relevant fast-winding rod 37, 39 has caused the central switching lever 43 to be pressed downwards and slightly tilted via the second switching lever 48. Thus, the mechanism is changed-over from the play mode to the fast-winding mode in the desired fast-winding direction.

When the non-activated fast-winding rod is actuated the previously latched fast-winding rod is released and moves outwards. The guiding edge 37e or 39e liberates the catch lever 162, so that this lever can pivot through its entire pivotal range. The return force exerted by the spring 21f of the head-mounting plate draws the projection 155 out of the fast-winding recess 162b and the head-mounting plate 21 moves back into the starting or ejection position from which, as described above, the play mode is started immediately.

PREFERENTIAL PLAYING DIRECTION UPON INSERTION OF A CASSETTE

The deck comprises a device which ensures that every time that a cassette is inserted into the empty cassette holder 321 starting is always effected in the normal playing direction, i.e. when the cassette 200 has been removed from the cassette holder 321 after ejection. If the cassette 200 has not been removed from the holder 321 and is reinserted to re-start, the deck will continue to play in the last playing direction.

Figure 15A:
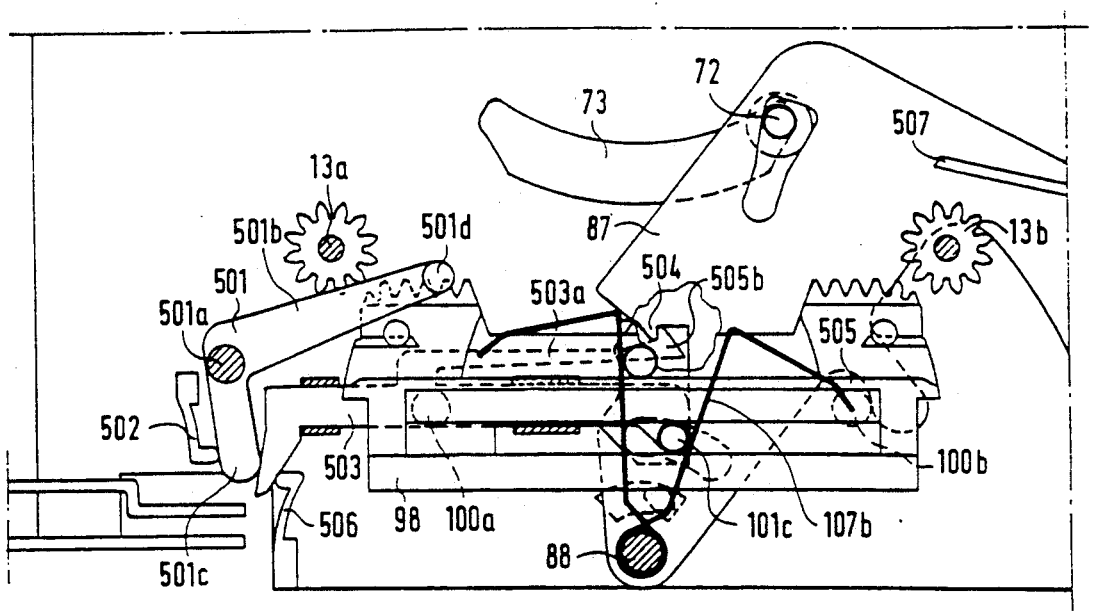
FIGS. 15a and 15b show a device for realizing a preferential playing direction after insertion of a cassette.
Figure 15B:
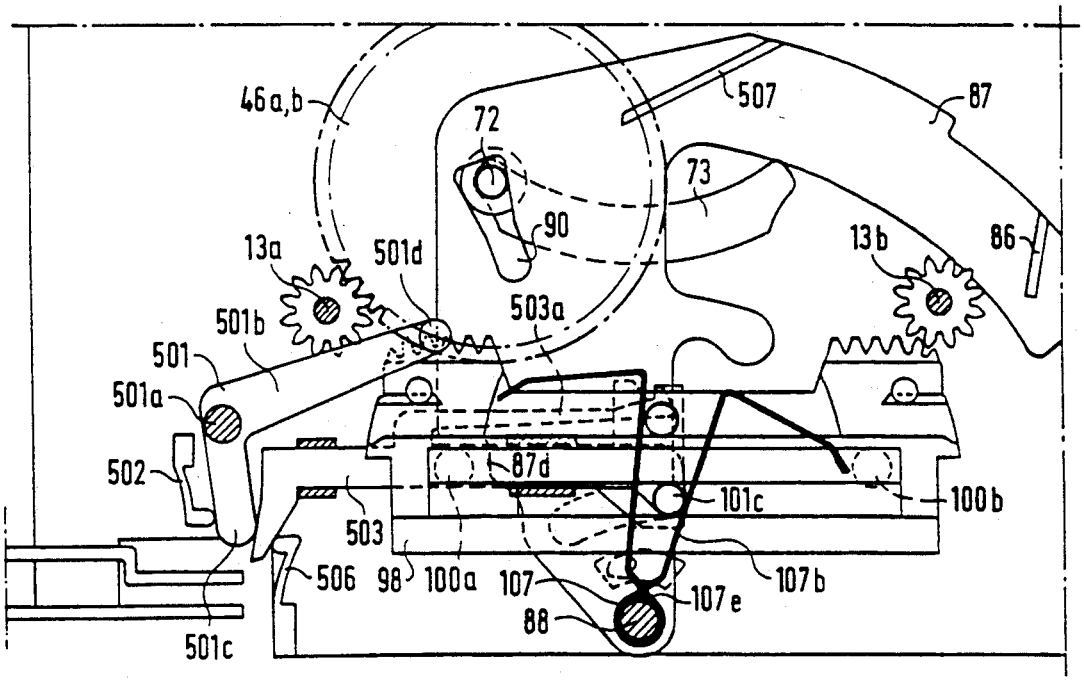

FIGS. 15a and 15b illustrate the operation of this device. The device comprises a cassette-sensing lever 501, which is pivotable about a fixed sensing-lever pivot 501a on the chassis. The cassette-sensing lever 501 has a first sensing arm 501b and a second sensing arm 501c. The first sensing arm 501b carries a sensing pin 501d. The sensing pin 501d is arranged in such a way that it is pushed aside by an inserted magnetic-tape cassette 200, causing the cassette-sensing lever 501 to be pivoted clockwise.

A spring 502 tends to urge the cassette-sensing lever 501 in the anti-clockwise direction. This is possible only if no cassette 200 has been inserted. There is provided an actuating member 503 having a spring arm 503a comprising a spring-arm hook 503b which is engageable behind a chassis nose 504. Moreover, the actuating member 503 carries an actuating pin 101c, which is situated between the limbs 107a, b of the return spring 107.

A spring 506 acts on the actuating member 503 to urge the actuating member 503 against the sensing arm 501c and pivot this arm clockwise. However, this is possible only if the spring-arm hook 503b is clear of the chassis nose 504 and no cassette is present in the cassette holder 321. The spring 506 then moves the actuating member 503 to the left and the cassette-sensing lever 501 is pivoted clockwise. revsere-playing mode as illustrated in FIG. 1 and FIG.

It is now assumed that the deck is in the 15b. The cassette holder 321 does not contain a cassette 200. Consequently, the cassette-sensing lever has been pivoted anti-clockwise and the sensing pin 501d projects into the empty cassette holder 321.

During the preceding playing operation the spring-arm hook 503 has engaged behind the chassis nose 504. As a result of this, the actuating member 503, which is locked by the chassis nose 504 and the spring-arm hook 503b, is in the position in which it has been shifted to the right. The return spring 107 is pivoted clockwise by the actuating pin 101c which has been moved to the right and acts upon the limb 107b. By means of the coupling element the limb 107a has moved the transport member 98 to the right. The rack portion 98b meshes with the toothed-wheel 47b on the flywheel.

As long as no cassette 200 is inserted into the deck the drive motor 9 is stationary. Consequently, the fact that the rack portion 98b and the toothed-wheel 47b on the flywheel have meshed merely results in a positive coupling but not in a further movement. If now a cassette 200 is inserted into the deck, causing the cassette-sensing lever 501 to be pivoted clockwise and to be disengaged from the actuating member, the motor 9 will be started The toothed-wheel 47b on the flywheel pulls the transport member to the right. The coupling element 100a then presses against the edge 87d of the reversing plate 87 and pivots this plate from the reverse play position into the forward play position. This initiates the direction-reversal process, in which the central switching lever 43 is set from the reverse position (FIGS. 1 to 3) to the forward position (FIGS. 4 to 6).

Concurrently with the reversing process, in which the central switching lever 43 is pivoted anti-clockwise, the double coupling wheel 46a, b with the central switching lever 43 is pivoted anti-clockwise and abuts against the spring arm 503a. This arm deflects and the spring-arm hook 503b is then pushed out of the latched position behind the chassis nose 504. The actuating member 503, which was latched in the right-hand position until now, is now moved to the left by the return spring 506. Thus, the contact between the cassette-sensing lever 501 and the actuating member 503 is restored. The pin actuating 101c no longer biases the limb 107b and the limb 107b returns the transport member 98 into its central position in a manner as described in the section Reversing mechanism with reference to FIGS. 7a to 7c.

When the reversal movement has been completed the deck is in the forward-playing mode. Thus, the inserted cassette is played back in the forward-playing mode.

If in an ejection process, in which the deck is in the forward-playing mode as illustrated in FIG. 15a, a magnetic-tape cassette 200 is ejected and removed from the deck, the spring 502 will pivot the cassette-sensing lever 501 anti-clockwise and the sensing pin 501d is pivoted into the empty cassette holder 321. During this pivotal movement, which corresponds to a detection of the presence of absence of a cassette in the deck, the second sensing arm 501c moves the actuating member 503 parallel to the direction of movement of the transport rod 98. Together with the actuating member 503 the spring arm 503a, whose end carries the spring-arm hook 503b, engages behind the chassis nose 504 on the chassis and is locked.

In this position shown in FIG. 15a the reversing plate 87 is in the position for the forward-playing mode. The actuating pin 101c has urged the limb 107b of the return spring 107 in the clockwise direction and has thereby pretensioned this spring. The coupling element 100b engages a recess 505 in the reversing plate 87. This means that the transport member 98 is retained in the position shown in FIG. 15a and the rack portion 98b cannot mesh with the toothed-wheel 47b on the flywheel. Consequently, in the case that the reversing plate 87 is already in the forward-playing position when the cassette 200 has been ejected and the cassette holder is empty the transport member 98 will not be moved unnecessarily. The projection 98d of the transport member remains in the same position and the limbs 107a, b are merely spread apart.

If now a cassette is inserted into the empty cassette holder 321 while the deck has been set to the forward-playing mode this cassette 200 will urge the first sensing arm 501b aside in the clockwise direction via the sensing pin 501d. However, the spring 506 cannot move the actuating member 503 towards the second sensing arm 501c because the spring-arm hook 503b remains locked behind the nose 504. Thus, if a cassette 200 is re-inserted playback is started in the forward-playing direction in which it has ended.

FIGS. 15a and 15b both show the restarting direction of the deck after complete removal of a cassette 200. If the cassette 200 has not been removed, i.e. has remained in the holder, the cassette-sensing lever 501 cannot perform any movements and cannot transmit any movement to the actuating member 503. This means that during restarting of the apparatus, while the cassette 200 has remained in the cassette holder, the deck is always started in the last playing direction.

We claim:

1. A magnetic-tape-cassette apparatus comprising
a deck for transporting a tape of a magnetic-tape cassette in a first and a second, opposite tape transport direction, said deck including a first and a second selectively drivable reel disc for the magnetic tape, a first and a second capstan drivable in different directions of rotation, and reel-disc drive means including a motor, said reel-disc drive means being switchable for alternately driving said capstans, and a switching mechanism comprising a movable transport member for switching said reel-disc drive means from one said reel disc to the other said reel disc in order to change the tape-transport direction, said transport member having axially spaced toothed-rack portions, wherein the improvement comprises:

a pair of oppositely rotatable toothed drive wheels selectively engageable with respective ones of said toothed rack portions of said transport member for moving said transport member;

said transport member is translatable between first and second opposite end positions in which said toothed-rack portions are in engagement with a respective said toothed drive wheel and is pivotable transversely of its direction of translation in such a way that the meshing between one of said toothed-rack portions and a respective one of said drive wheels is cancelled in a final stage of translation of said transport member in said end positions with said respective drive wheel by a tilting movement of the transport member to disengage the teeth of said drive wheel and said transport member; and a return spring coupled to said transport member such that it is pretensioned during the transverse movement of said transport member for tilting said transport member in said final stage of translation and for returning said transport member into a neutral center position in which said transport member is disengaged from said drive wheels.

2. A magnetic-tape-cassette apparatus as claimed in claim 1, wherein:

said transport member comprises a pressure pin and a coupling element, and said return spring comprises a first spring limb which presses against said pressure pin of said transport member as said transport member is translated towards a said end position for tilting and disengaging said transport member from the respective drive wheel, and a second spring limb which is pretensioned by said coupling element of said transport member during translation thereof for returning said transport member to said neutral center position after said toothed rack portion disengages from said respective drive wheel.

3. A magnetic-tape-cassette apparatus as claimed in claim 2, further comprising an actuating pin, and wherein said return spring is a hairpin spring having a bend with two limbs extending therefrom, said actuating pin and, spaced therefrom, said transport-member coupling element are situated between said limbs of said hairpin spring.

4. A magnetic-tape-cassette apparatus as claimed in claim 3, wherein:

said transport member comprises a pair of pressure pins; and said spring limbs comprise outwardly projecting portions for cooperating with a respective said pressure pin of said transport member for assisting the tilting movement of said transport member in said final stage of translation of said transport member.

5. A magnetic-tape-cassette apparatus as claimed in claim 1, wherein said transport member comprises axial end portions having adjacent guide-pin grooves and tilting grooves which extend parallel to the longitudinal axis of said transport member, said guide-pin and tilting grooves being interconnected in such a way that a said guide pin which has entered a guide-pin groove during the transverse movement of said transport member, changes over from said guide-pin groove into said tilting groove in the final, tilting stage of movement of said transport member, said transport member being tilted to cancel meshing of the teeth both under the influence of the disengaging forces of said teeth and under the influence of the force of said return spring.

6. A magnetic-tape-cassette apparatus as claimed in claim 1, further comprising a pair of guide members, said transport member including a stop member which cooperates with said guide members in such a manner that said stop member brakes and stops the return movement of said transport member by abutment against said guide members before said transport member reaches its neutral center position, in said stopped position said return spring tilts said transport member back into its non-tilted normal position, in which non-tilted position said stop has no effect and the transport member is moveable into its neutral center position.

* * * * *